(12) United States Patent
Fang

(10) Patent No.: US 10,305,649 B2
(45) Date of Patent: May 28, 2019

(54) INTERFERENCE COORDINATION METHOD, APPARATUS, AND SYSTEM

(71) Applicant: Huawei Technologies Co., Ltd., Shenzhen, Guangdong (CN)

(72) Inventor: Zhipeng Fang, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 239 days.

(21) Appl. No.: 15/179,634

(22) Filed: Jun. 10, 2016

(65) Prior Publication Data

US 2016/0285602 A1    Sep. 29, 2016

Related U.S. Application Data

(63) Continuation of application No. PCT/CN2013/089331, filed on Dec. 13, 2013.

(51) Int. Cl.
*H04L 5/00* (2006.01)
*H04W 24/02* (2009.01)
(Continued)

(52) U.S. Cl.
CPC .......... *H04L 5/0032* (2013.01); *H04J 11/005* (2013.01); *H04W 24/02* (2013.01);
(Continued)

(58) Field of Classification Search
None
See application file for complete search history.

(56) References Cited

U.S. PATENT DOCUMENTS

2011/0098054 A1    4/2011   Gorokhov et al.
2012/0071200 A1    3/2012   Bienas et al.
(Continued)

FOREIGN PATENT DOCUMENTS

CN    101741437 A    6/2010
CN    101945409 A    1/2011
(Continued)

OTHER PUBLICATIONS

"3rd Generation Partnership Project; Technical Specification Group Radio Access Network; Evolved Universal Terrestrial Radio Access Network (E-UTRAN); X2 application protocol (X2AP)(Release 11)", 3GPP TS 36.423 V11.6.0, Sep. 2013, 144 pages.

*Primary Examiner* — Adnan Baig

(57) ABSTRACT

An interference coordination method, apparatus, and system are provided in a communications system, which including a first cell and at least one neighboring cell of the first cell. A first cell management apparatus corresponding to the first cell sends configuration information of an uplink reference signal to at least one second cell management apparatus corresponding to the at least one neighboring cell, so that each second cell management apparatus measures the uplink reference signal sent by UE within the first cell, to obtain a second measured value; and the first cell management apparatus measures the uplink reference signal sent by the UE, to obtain a first measured value; an interference coordination apparatus coordinates downlink transmit power of the first cell and the at least one neighboring cell according to the first measured value and at least one second measured value, which effectively reduces inter-cell interference and increases a network capacity.

12 Claims, 9 Drawing Sheets

(51) Int. Cl.
- *H04W 52/24* (2009.01)
- *H04W 72/08* (2009.01)
- *H04J 11/00* (2006.01)
- *H04W 24/10* (2009.01)
- *H04W 52/14* (2009.01)
- *H04W 28/16* (2009.01)
- *H04W 72/04* (2009.01)

(52) U.S. Cl.
CPC ....... *H04W 52/241* (2013.01); *H04W 52/243* (2013.01); *H04W 52/244* (2013.01); *H04W 52/245* (2013.01); *H04W 72/082* (2013.01); *H04J 11/0053* (2013.01); *H04L 5/0051* (2013.01); *H04W 24/10* (2013.01); *H04W 28/16* (2013.01); *H04W 52/143* (2013.01); *H04W 72/0426* (2013.01)

(56) References Cited

U.S. PATENT DOCUMENTS

| | | | |
|---|---|---|---|
| 2012/0113843 A1 | 5/2012 | Watfa et al. | |
| 2013/0225217 A1 | 8/2013 | Li et al. | |
| 2013/0237274 A1* | 9/2013 | Kwon | H04W 52/08 455/522 |
| 2013/0272170 A1 | 10/2013 | Chatterjee et al. | |
| 2013/0308473 A1* | 11/2013 | Sun | H04W 36/30 370/252 |
| 2014/0148181 A1* | 5/2014 | Lee | H04W 72/085 455/452.1 |
| 2014/0204765 A1 | 7/2014 | Chai et al. | |
| 2015/0073998 A1 | 3/2015 | Alsina et al. | |
| 2015/0319703 A1 | 11/2015 | Kwon et al. | |

FOREIGN PATENT DOCUMENTS

| | | |
|---|---|---|
| CN | 102170304 A | 8/2011 |
| CN | 102395163 A | 3/2012 |
| CN | 102413477 A | 4/2012 |
| CN | 102413548 A | 4/2012 |
| CN | 102595436 A | 7/2012 |
| CN | 102598807 A | 7/2012 |
| CN | 103024751 A | 4/2013 |
| CN | 103067927 A | 4/2013 |
| CN | 103297979 A | 9/2013 |
| CN | 103391574 A | 11/2013 |
| EP | 2665305 A1 | 11/2013 |
| JP | 2013509071 A | 3/2013 |
| JP | 2016538654 A | 12/2016 |
| WO | 2011049287 A2 | 4/2011 |
| WO | 2013/073787 A1 | 5/2013 |
| WO | 2013/120265 A1 | 8/2013 |

* cited by examiner

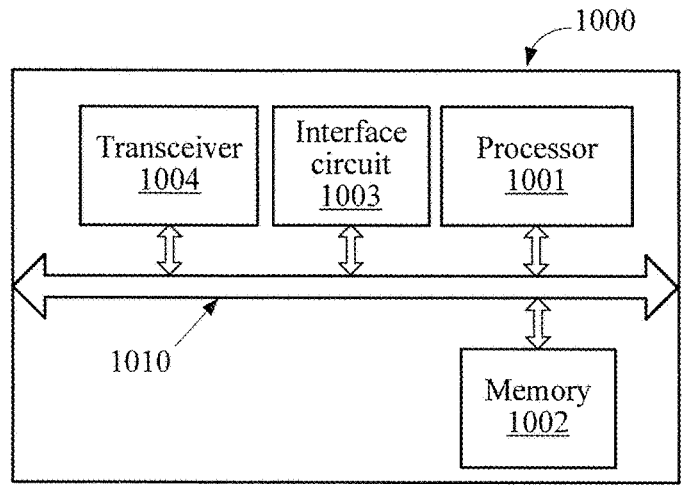

FIG. 10

| A first cell management apparatus sends configuration information of an uplink reference signal to at least one second cell management apparatus, where the configuration information is used to indicate a position of a resource in which the uplink reference signal is located, and measures, on the resource in which the uplink reference signal is located, the uplink reference signal sent by UE within a first cell, to obtain a first measured value | 1101 |

| Each second cell management apparatus measures, on the resource in which the uplink reference signal is located, the uplink reference signal sent by the UE within the first cell, to obtain a second measured value | 1102 |

| An interference coordination apparatus coordinates downlink transmit power of the first cell and downlink transmit power of at least one neighboring cell of the first cell according to the first measured value and at least one second measured value | 1103 |

INTERFERENCE COORDINATION METHOD, APPARATUS, AND SYSTEM

CROSS-REFERENCE TO RELATED APPLICATIONS

This application is a continuation of International Application No. PCT/CN2013/089331, filed on Dec. 13, 2013, which is hereby incorporated by reference in its entirety.

TECHNICAL FIELD

Embodiments of the present application relate to the field of communications technologies, and in particular, to an interference coordination method, apparatus, and system.

BACKGROUND

With development of mobile communications technologies and broadband wireless access technologies, services of the both penetrate into each other. To meet a demand for broadband mobile communications and cope with a challenge of mobile broadband communications, an LTE (Long Term Evolution) communications system is introduced into the mobile communications technologies.

In the LTE communications system, because an OFDM (orthogonal frequency division multiplexing) technology is used, sub-channels are orthogonal with each other, so as to properly solve a problem of intra-cell interference. However, the LTE system has a high requirement on spectrum utilization, and therefore, a manner of single-frequency networking is introduced to improve the spectrum utilization, which, however, introduces a problem of inter-cell interference. For example, if neighboring cells use a same spectrum resource in an overlapping area of their coverage, serious ICI (inter-cell interference) will be caused in the overlapping area. It can be seen that in an LTE communications system, interference affecting system performance is mainly inter-cell interference.

Therefore, how to reduce inter-cell interference for improving service performance of the system, especially performance in a cell edge area, is an important problem to be urgently solved for the LTE system.

SUMMARY

Embodiments of the present application provide an interference coordination method, apparatus, and system, so as to reduce inter-cell interference.

According to a first aspect, a cell management apparatus is provided, where the cell management apparatus is configured to manage a first cell in a communications system, where the communications system includes the first cell and at least one neighboring cell of the first cell, where each cell corresponds to one cell management apparatus, a cell management apparatus corresponding to the first cell is a first cell management apparatus, and a cell management apparatus corresponding to the neighboring cell of the first cell is a second cell management apparatus, and the apparatus includes: a first interface unit, configured to send configuration information of an uplink reference signal to at least one second cell management apparatus, where the configuration information is used to indicate a position of a resource in which the uplink reference signal is located, so that each of the at least one second cell management apparatus measures, according to the configuration information and on the resource in which the uplink reference signal is located, the uplink reference signal sent by user equipment within the first cell, to obtain a second measured value; a measurement unit, configured to measure, according to the configuration information and on the resource in which the uplink reference signal is located, the uplink reference signal sent by the user equipment within the first cell, to obtain a first measured value; and a second interface unit, configured to send the first measured value, which is obtained by the measurement unit by measurement, to an interference coordination apparatus, so that the interference coordination apparatus coordinates downlink transmit power of the first cell and downlink transmit power of the at least one neighboring cell of the first cell according to the first measured value and at least one second measured value.

With reference to the first aspect, in a first implementation manner of the first aspect, the first interface unit is further configured to receive the second measured value sent by each second cell management apparatus.

With reference to the first implementation manner of the first aspect, in a second implementation manner of the first aspect, the second interface unit is further configured to send the at least one second measured value to the interference coordination apparatus.

With reference to the first implementation manner of the first aspect, in a third implementation manner of the first aspect, the apparatus further includes an interference determining unit, configured to determine interference information according to the first measured value and the at least one second measured value, where the second interface unit is further configured to send the interference information to the interference coordination apparatus, so that the interference coordination apparatus groups multiple cells in the communications system into at least one cluster according to the interference information, where the first cell and at least one neighboring cell of the first cell belong to a same cluster.

With reference to the first aspect or any implementation manner of the first to third implementation manners of the first aspect, in a fourth implementation manner of the first aspect, the uplink reference signal is a sounding reference signal (SRS).

With reference to the first aspect or any implementation manner of the first to fourth implementation manners of the first aspect, in a fifth implementation manner of the first aspect, the resource in which the uplink reference signal is located includes a time resource, a frequency resource, or a time-frequency resource in which the uplink reference signal is located.

With reference to the first aspect or any implementation manner of the first to fifth implementation manners of the first aspect, in a sixth implementation manner of the first aspect, the first measured value includes uplink reference signal received power (RSRP) or uplink reference signal received quality (RSRQ); and the second measured value includes uplink reference signal received power (RSRP) or uplink reference signal received quality (RSRQ).

According to a second aspect, a cell management apparatus is provided, where the cell management apparatus is configured to manage a neighboring cell of a first cell in a communications system, where the communications system includes the first cell and at least one neighboring cell of the first cell, where each cell corresponds to one cell management apparatus, a cell management apparatus corresponding to the first cell is a first cell management apparatus, and a cell management apparatus corresponding to the neighboring cell of the first cell is a second cell management apparatus, and the apparatus includes: a first interface unit, configured to receive configuration information, of an uplink reference signal, sent by the first cell management apparatus, where the configuration information is used to indicate a position of a resource in which the uplink reference signal is located; and a measurement unit, configured to measure, according to the configuration information received by the first interface unit and on the resource in which the uplink reference signal is located, the uplink reference signal sent by user equipment within the first cell, to obtain a second measured value, where the second measured value is used by an interference coordination apparatus to coordinate downlink transmit power of the first cell and downlink transmit power of the at least one neighboring cell of the first cell.

With reference to the second aspect, in a first implementation manner of the second aspect, the cell management apparatus further includes a second interface unit, where the second interface unit is configured to send the second measured value to the interference coordination apparatus.

With reference to the second aspect, in a second implementation manner of the second aspect, the first interface unit is further configured to send the second measured value to the first cell management apparatus, where the second measured value is sent by the first cell management apparatus to the interference coordination apparatus, or the second measured value is used by the first cell management apparatus to determine interference information, so that the interference coordination apparatus groups multiple cells in the communications system into at least one cluster according to the interference information, where the first cell and at least one neighboring cell of the first cell belong to a same cluster.

With reference to the second aspect or any implementation manner of the first to second implementation manners of the second aspect, in a third implementation manner of the second aspect, the uplink reference signal is a sounding reference signal (SRS).

With reference to the second aspect or any implementation manner of the first to third implementation manners of the second aspect, in a fourth implementation manner of the second aspect, the resource in which the uplink reference signal is located includes a time resource, a frequency resource, or a time-frequency resource in which the uplink reference signal is located.

With reference to the second aspect or any implementation manner of the first to fourth implementation manners of the second aspect, in a fifth implementation manner of the second aspect, the second measured value includes uplink reference signal received power (RSRP) or uplink reference signal received quality (RSRQ).

According to a third aspect, an interference coordination apparatus is provided, which is configured to coordinate downlink transmit power of multiple cells in a communications system, where the multiple cells include a first cell and at least one neighboring cell of the first cell, where each cell corresponds to one cell management apparatus, a cell management apparatus corresponding to the first cell is a first cell management apparatus, and a cell management apparatus corresponding to the neighboring cell of the first cell is a second cell management apparatus, and the apparatus includes: an obtaining unit, configured to obtain a first measured value and at least one second measured value, where the first measured value is obtained by the first cell management apparatus by measurement, on a resource in which an uplink reference signal is located, the uplink reference signal sent by user equipment within the first cell, and the at least one second measured value is obtained by at least one second cell management apparatus by measurement, on the resource in which the uplink reference signal is located, the uplink reference signal sent by the user equipment within the first cell; and a coordination unit, configured to coordinate downlink transmit power of the first cell and downlink transmit power of the at least one neighboring cell of the first cell according to the first measured value and the at least one second measured value.

With reference to the third aspect, in a first implementation manner of the third aspect, the obtaining unit is specifically configured to obtain the first measured value and the at least one second measured value from the cell management apparatus of the first cell; or the obtaining unit is specifically configured to obtain the first measured value from the cell management apparatus of the first cell and obtain the at least one second measured value from the at least one second cell management apparatus.

With reference to the third aspect or the first implementation manner of the third aspect, in a second implementation manner of the third aspect, the apparatus further includes a receiving unit and a clustering unit, where the receiving unit is configured to receive interference information sent by the cell management apparatus of the first cell; and the clustering unit is configured to group the multiple cells in the communications system into at least one cluster according to the interference information received by the receiving unit, where the first cell and at least one neighboring cell of the first cell belong to a same cluster.

With reference to the third aspect or any implementation manner of the first to second implementation manners of the third aspect, in a third implementation manner of the third aspect, the uplink reference signal is a sounding reference signal (SRS).

With reference to the third aspect or any implementation manner of the first to third implementation manners of the third aspect, in a fourth implementation manner of the third aspect, the resource in which the uplink reference signal is located includes a time resource, a frequency resource, or a time-frequency resource in which the uplink reference signal is located.

With reference to the third aspect or any implementation manner of the first to fourth implementation manners of the third aspect, in a fifth implementation manner of the third aspect, the first measured value includes uplink reference signal received power (RSRP) or uplink reference signal received quality (RSRQ); and the second measured value includes uplink reference signal received power (RSRP) or uplink reference signal received quality (RSRQ).

According to a fourth aspect, an interference coordination system is provided, where the system includes the first cell management apparatus according to the foregoing first aspect or any one of the implementation manners of the first aspect, at least one second cell management apparatus according to the foregoing second aspect or any one of the implementation manners of the second aspect, and the interference coordination apparatus according to the foregoing third aspect or any one of the implementation manners of the third aspect.

According to a fifth aspect, an interference coordination method is provided, where the method is applicable to a communications system, the communications system includes a first cell and at least one neighboring cell of the first cell, where each cell corresponds to one cell management apparatus, a cell management apparatus corresponding to the first cell is a first cell management apparatus, and a cell management apparatus corresponding to the neighboring cell of the first cell is a second cell management apparatus, and the method includes: sending configuration information of an uplink reference signal to at least one second cell management apparatus, where the configuration information is used to indicate a position of a resource in which the uplink reference signal is located, so that each second cell management apparatus measures, according to the configuration information and on the resource in which the uplink reference signal is located, the uplink reference signal sent by user equipment within the first cell, to obtain a second measured value; measuring, according to the configuration information and on the resource in which the uplink reference signal is located, the uplink reference signal sent by the user equipment within the first cell, to obtain a first measured value; and sending the first measured value, which is obtained by measurement, to an interference coordination apparatus, so that the interference coordination apparatus coordinates downlink transmit power of the first cell and downlink transmit power of the at least one neighboring cell of the first cell according to the first measured value and at least one second measured value.

With reference to the fifth aspect, in a first implementation manner of the fifth aspect, the method further includes: receiving the second measured value sent by each second cell management apparatus.

With reference to the first implementation manner of the fifth aspect, in a second implementation manner of the fifth aspect, the method further includes: sending the at least one second measured value to the interference coordination apparatus.

With reference to the first implementation manner of the fifth aspect, in a third implementation manner of the fifth aspect, the method further includes: determining interference information according to the first measured value and the at least one second measured value; and sending the interference information to the interference coordination apparatus, so that the interference coordination apparatus groups multiple cells in the communications system into at least one cluster according to the interference information, where the first cell and at least one neighboring cell of the first cell belong to a same cluster.

With reference to the fifth aspect or any implementation manner of the first to third implementation manners of the fifth aspect, in a fourth implementation manner of the fifth aspect, the uplink reference signal is a sounding reference signal (SRS).

With reference to the fifth aspect or any implementation manner of the first to fourth implementation manners of the fifth aspect, in a fifth implementation manner of the fifth aspect, the resource in which the uplink reference signal is located includes a time resource, a frequency resource, or a time-frequency resource in which the uplink reference signal is located.

With reference to the fifth aspect or any implementation manner of the first to fifth implementation manners of the fifth aspect, in a sixth implementation manner of the fifth aspect, the first measured value includes uplink reference signal received power (RSRP) or uplink reference signal received quality (RSRQ); and the second measured value includes uplink reference signal received power (RSRP) or uplink reference signal received quality (RSRQ).

According to a sixth aspect, an interference coordination method is provided, where the method is applicable to a communications system, the communications system includes a first cell and at least one neighboring cell of the first cell, where each cell corresponds to one cell management apparatus, a cell management apparatus corresponding to the first cell is a first cell management apparatus, and a cell management apparatus corresponding to the neighboring cell of the first cell is a second cell management apparatus, and the method includes: receiving configuration information, of an uplink reference signal, sent by the first cell management apparatus, where the configuration information is used to indicate a position of a resource in which the uplink reference signal is located; and measuring, according to the received configuration information and on the resource in which the uplink reference signal is located, the uplink reference signal sent by user equipment within the first cell, to obtain a second measured value, where the second measured value is used by an interference coordination apparatus to coordinate downlink transmit power of the first cell and downlink transmit power of the at least one neighboring cell of the first cell.

With reference to the sixth aspect, in a first implementation manner of the sixth aspect, the method further includes: sending the second measured value to the interference coordination apparatus.

With reference to the sixth aspect, in a second implementation manner of the sixth aspect, the method further includes: sending the second measured value to the first cell management apparatus, where the second measured value is sent by the first cell management apparatus to the interference coordination apparatus, or the second measured value is used by the first cell management apparatus to determine interference information, so that the interference coordination apparatus groups multiple cells in the communications system into at least one cluster according to the interference information, where the first cell and at least one neighboring cell of the first cell belong to a same cluster.

With reference to the sixth aspect or any implementation manner of the first to second implementation manners of the sixth aspect, in a third implementation manner of the sixth aspect, the uplink reference signal is a sounding reference signal (SRS).

With reference to the sixth aspect or any implementation manner of the first to third implementation manners of the sixth aspect, in a fourth implementation manner of the sixth aspect, the resource in which the uplink reference signal is located includes a time resource, a frequency resource, or a time-frequency resource in which the uplink reference signal is located.

With reference to the sixth aspect or any implementation manner of the first to fourth implementation manners of the sixth aspect, in a fifth implementation manner of the sixth aspect, the second measured value includes uplink reference signal received power (RSRP) or uplink reference signal received quality (RSRQ).

According to a seventh aspect, an interference coordination method is provided, where the method is applicable to a communications system, the communications system includes a first cell and at least one neighboring cell of the first cell, where each cell corresponds to one cell management apparatus, a cell management apparatus corresponding to the first cell is a first cell management apparatus, and a cell management apparatus corresponding to the neighboring cell of the first cell is a second cell management apparatus, and the method includes: obtaining a first measured value and at least one second measured value, where the first measured value is obtained by the first cell management apparatus by measurement, on a resource in which an uplink reference signal is located, the uplink reference signal sent by user equipment within the first cell, and the at least one second measured value is obtained by at least one second cell management apparatus by measurement, on the resource in which the uplink reference signal is located, the uplink reference signal sent by the user equipment within the first cell; and coordinating downlink transmit power of the first cell and downlink transmit power of the at least one neighboring cell of the first cell according to the first measured value and the at least one second measured value.

With reference to the seventh aspect, in a first implementation manner of the seventh aspect, the obtaining a first measured value and at least one second measured value includes: obtaining the first measured value and the at least one second measured value from the cell management apparatus of the first cell; or obtaining the first measured value from the cell management apparatus of the first cell and obtaining the at least one second measured value from the at least one second cell management apparatus.

With reference to the seventh aspect or the first implementation manner of the seventh aspect, in a second implementation manner of the seventh aspect, the method further includes: receiving interference information sent by the cell management apparatus of the first cell; and grouping multiple cells in the communications system into at least one cluster according to the received interference information, where the first cell and at least one neighboring cell of the first cell belong to a same cluster.

With reference to the seventh aspect or any implementation manner of the first to second implementation manners of the seventh aspect, in a third implementation manner of the seventh aspect, the uplink reference signal is a sounding reference signal (SRS).

With reference to the seventh aspect or any implementation manner of the first to third implementation manners of the seventh aspect, in a fourth implementation manner of the seventh aspect, the resource in which the uplink reference signal is located includes a time resource, a frequency resource, or a time-frequency resource in which the uplink reference signal is located.

With reference to the seventh aspect or any implementation manner of the first to fourth implementation manners of the seventh aspect, in a fifth implementation manner of the seventh aspect, the first measured value includes uplink reference signal received power (RSRP) or uplink reference signal received quality (RSRQ); and the second measured value includes uplink reference signal received power (RSRP) or uplink reference signal received quality (RSRQ).

The embodiments of the present application provide a cell management apparatus configured to manage a first cell, where the apparatus includes: a first interface unit, configured to send configuration information of an uplink reference signal to at least one second cell management apparatus, where the configuration information is used to indicate a position of a resource in which the uplink reference signal is located, so that each second cell management apparatus measures, according to the configuration information and on the resource in which the uplink reference signal is located, the uplink reference signal sent by user equipment within the first cell, to obtain a second measured value; a measurement unit, configured to measure, according to the configuration information and on the resource in which the uplink reference signal is located, the uplink reference signal sent by the user equipment within the first cell, to obtain a first measured value; and a second interface unit, configured to send the first measured value to an interference coordination apparatus. In this way, the interference coordination apparatus coordinates downlink transmit power of the first cell and downlink transmit power of the at least one neighboring cell of the first cell according to the first measured value and at least one second measured value. Therefore, the measured values are obtained based on the uplink reference signal, not only interference from a neighboring cell of a cell to edge UE in the cell but also interference from the neighboring cell to non-edge UE in the cell can be considered; and transmit power of cells is coordinated according to the measured values obtained based on the uplink reference signal, which effectively reduces inter-cell interference.

BRIEF DESCRIPTION OF THE DRAWINGS

To describe the technical solutions in the embodiments of the present application more clearly, the following briefly introduces the accompanying drawings required for describing the embodiments. Apparently, the accompanying drawings in the following description show merely some embodiments of the present application, and a person of ordinary skill in the art may still derive other drawings from these accompanying drawings without creative efforts.

FIG. 10 is a schematic block diagram of an interference coordination apparatus according to another embodiment of the present application;

FIG. 11 is a flowchart of an interference coordination method according to an embodiment of the present application;

DETAILED DESCRIPTION

Figure 1:
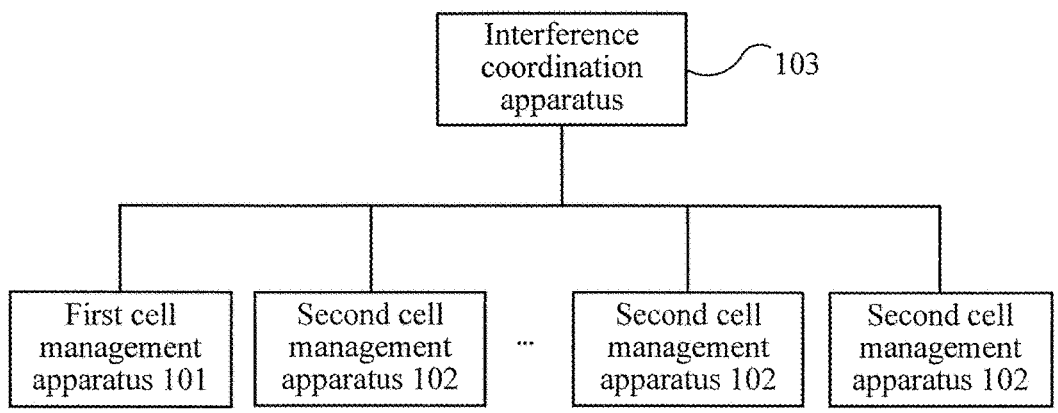
FIG. 1 is a schematic block diagram of an interference coordination system according to an embodiment of the present application.

The following clearly describes the technical solutions in the embodiments of the present application with reference to the accompanying drawings in the embodiments of the present application. Apparently, the described embodiments are a part rather than all of the embodiments of the present application. All other embodiments obtained by a person of ordinary skill in the art based on the embodiments of the present application without creative efforts shall fall within the protection scope of the present application.

It should be understood that, the technical solutions of the embodiments of the present application may be applied to various communications systems, such as: a GSM (global system for mobile communications), a CDMA (code division multiple access) system, a WCDMA (wideband code division multiple access) system, a GPRS (general packet radio service) system, an LTE system, an LTE FDD (frequency division duplex) system, an LTE TDD (time division duplex) system, and a UMTS (universal mobile telecommunications system). It should be understood that, no limitation is set thereto in the present application.

In the embodiments of the present application, UE may be referred to as a terminal, a MS (mobile station), a mobile terminal, and the like. The user equipment may communicate with one or more core networks through a radio access network (RAN). For example, the user equipment may be a mobile phone (or referred to as a "cellular" phone), or a computer with a mobile terminal; for example, the user equipment may be a portable, pocket-sized, handheld, computer built-in, or vehicle-mounted mobile apparatus, and exchange voice and/or data with a radio access network.

The base station may be a BTS (base transceiver station) in GSM or CDMA, or may be an NB (NodeB) in WCDMA or a BS (base station) in UMTS, or may be an eNodeB (evolved NodeB) in LTE, which is not limited in the present application.

In the embodiments of the present application, connections between one component and another (for example, between modules in the present application) may include wired and/or wireless connections. A wired connection may include but not limited to cables formed by various media, for example, an optical fiber, a conductive cable, a semiconductor line; or include other forms, such as an internal bus, a circuit, and a backplane. A wireless connection is a connection capable of implementing wireless communication, including but not limited to radio frequency, infrared, Bluetooth, and so on. An internal or external interface may exist between two components, where the interface may be a physical or logical interface.

At present, UE performs measurement reporting according to a measurement event configured by a network side. However, each measurement event has its entry condition. Therefore, not all UEs in a cell perform measurement reporting. For example, an entry condition of event A3 is that a measurement result of a neighboring cell is greater than a preset threshold of a measurement result of a serving cell. Therefore, center UE in a cell does not meet this entry condition, and therefore does not perform measurement reporting. Therefore, when network performance is estimated by using downlink channel information, interference from a neighboring cell to the center UE is actually overlooked. It can be seen that in the process of estimating network performance, accuracy of network performance evaluation may be further improved, thereby reducing inter-cell interference more effectively and improving service performance of a communications system.

In view of this, in the following embodiments of the present application, a measurement result, of an uplink RS (reference signal), obtained by a cell is used to replace a measurement result, of a downlink RS, obtained by a UE to estimate network performance, thereby determining downlink transmit power of each cell. Compared with downlink RS measurement, uplink RS measurement has advantages in both stability and measurement accuracy, and a center UE in each cell can send an uplink reference signal. Therefore, a neighboring cell of the cell may measure the uplink reference signal, so that during subsequent network performance estimation, not only interference from the neighboring cell to an edge UE in the cell can be considered, but also interference from the neighboring cell to a non-edge UE (a center UE) in the cell in a downlink direction can be considered; and transmit power of the cells is coordinated based on the uplink RS, which effectively reduces inter-cell interference. Besides, because the interference to the non-edge UE is considered, a throughput gain of UE which is near the center of the cell and is subject to weak interference can be improved, thereby increasing a network capacity.

With reference to the accompanying drawings, the following discusses embodiments in which interference coordination is performed according to a measurement result of an uplink RS.

FIG. 1 is a schematic block diagram of an interference coordination system according to an embodiment of the present application. The interference coordination system 100 in FIG. 1 is configured to coordinate downlink transmit power of multiple cells, so as to reduce inter-cell interference. For convenience of discussion, it is assumed that the multiple cells include a first cell and a neighboring cell of the first cell. Certainly, the first cell may be any cell of the multiple cells, and one or more neighboring cells of the first cell may exist, which is not limited in the embodiment of the present application.

Each cell corresponds to one cell management apparatus, a cell management apparatus corresponding to the first cell is a first cell management apparatus, and a cell management apparatus corresponding to the neighboring cell of the first cell is a second cell management apparatus. It should be noted that in the embodiment of the present application, each cell management apparatus may correspond to one or more cells.

The foregoing interference coordination system 100 includes multiple cell management apparatuses and an interference coordination apparatus 103 connected with the multiple cell management apparatuses. Each management unit is configured to manage one cell of the foregoing multiple cells. For ease of description, the diagram shows a first cell management apparatus 101 and at least one second cell management apparatus 102 respectively corresponding to at least one neighboring cell of the first cell.

The first cell management apparatus 101 sends configuration information of an uplink reference signal to the at least one second cell management apparatus 102, where the configuration information is used to indicate a position of a resource in which the uplink reference signal is located, and measures, on the resource in which the uplink reference signal is located, the uplink reference signal sent by UE within the first cell, to obtain a first measured value.

Each second cell management apparatus 102 measures, on the resource in which the uplink reference signal is located, the uplink reference signal sent by the UE within the first cell, to obtain a second measured value.

The interference coordination apparatus 103 coordinates downlink transmit power of the first cell and downlink transmit power of the at least one neighboring cell of the first cell according to the first measured value and at least one second measured value.

According to the foregoing solution, each cell management apparatus obtains a measured value based on an uplink reference signal sent by UE, in this way, not only interference from a neighboring cell of a cell to an edge UE in the cell but also interference from the neighboring cell to a non-edge UE in the cell can be considered; and an interference coordination apparatus coordinates transmit power of cells according to the measured values obtained based on the uplink reference signal, which effectively reduces inter-cell interference. Besides, because the interference to the non-edge UE is considered, a throughput gain of UE which is near the center of the cell and is subject to weak interference can be improved, thereby increasing a network capacity.

It should be noted that the cell management apparatuses may send their respective measured values to the interference coordination apparatus 103 separately, or may send their respective measured values to a cell management apparatus (for example, the first cell management apparatus) collectively, and the cell management apparatus then sends the measured values to the interference coordination apparatus 103. Besides, the measured values sent to the interference coordination apparatus 103 may be values that are not processed, or may be values that are preprocessed, for example, values that undergo filtering processing.

Besides, the cell management apparatuses may send their respective measured values to the first cell management apparatus 101, and the first cell management apparatus 101 processes the measured values and then sends the measured values to the interference coordination apparatus 103. For example, the first cell management apparatus 101 sorts the measurements values according to UE, where all measured values for a specific UE may include all measured values of an edge UE or all measured values of a center UE, and then sends the measured values to the interference coordination apparatus 103, so that the interference coordination apparatus 103 can coordinate downlink transmit power according to measured values of each UE. Certainly, the measured values may not be processed by the first cell management apparatus; in this case, the interference coordination apparatus 103 needs to sort the measured values, so as to compute a modulation coding scheme (MCS) by using all measured values of a UE as an input, thereby determining a scheduling priority to determine optimal transmit power. In brief, a manner for reporting a measured value by each cell management apparatus is not limited in the embodiment of the present application; the cell management apparatuses may report their respective measured values to the interference coordination apparatus separately, or may report the measured values to the interference coordination apparatus by using a cell management apparatus. Besides, whether the reported measured values are processed is not limited either.

In another embodiment of the present application, functions of the system 100 may be further extended.

In an optional embodiment, each second cell management apparatus 102 may be configured to send a second measured value to the first cell management apparatus, and the first cell management apparatus may be configured to receive the second measured value sent by each second cell management apparatus 102. Further, the first cell management apparatus 101 sends the at least one second measured value to the interference coordination apparatus 103. The received second measured values may be sorted according to UE and then sent to the interference coordination apparatus 103. The interference coordination apparatus 103 then computes an MCS by using all measured values of each UE as an input, thereby determining a scheduling priority to determine optimal transmit power.

Optionally, the configuration information of the uplink reference signal may include a time resource, a frequency resource, or a time-frequency resource used by the UE to send the uplink reference signal. In this way, the neighboring cell may measure, on a corresponding resource, the uplink reference signal sent by the UE.

Specifically, the measured value reported by the first cell management apparatus may be schematically shown in the following table:

| IE/Group Name (IE/group) Name | Presence (Presence) | Range (Range) | IE type and reference (IE type and reference) | Semantics description (Semantics description) | Criticality (Criticality) | Assigned Criticality (Assigned Criticality) |
|---|---|---|---|---|---|---|
| Rpt Global eNB ID | M | | 36.423 9.2.22 | | YES (YES) | |
| Rpt Cell ID | M | 0 to max cell id | | | YES | |
| Rpt Cell PCI | M | | INTEGER (0 . . . 503, . . .) | Physical Cell Identifier of the report cell (Physical Cell Identifier of the report cell) | — | — |
| Rsv | M | 0 to max cell id | | | YES | |
| Serve Global eNB ID | M | | 36.423 9.2.22 | | YES | Reject (Reject) |
| Serve Local Cell ID | M | 0 to max local cell id | | | YES | |
| Serve Cell ID | M | 0 to max cell id | | | YES | |
| currentSFN | M | (0 . . . 1023) | INTEGER (INTEGER) | | YES | |
| UE SRS RSRP List | M | 1 . . . RptUeNum | | | YES | |
| >Cell Ue Inst | M | 0 to 65535 | INTEGER | | YES | |
| >Mac Ue ID | M | 0 to 65535 | INTEGER | | YES | |
| >RSRP | M | 1 to 65535 | INTEGER | | YES | |

Optionally, the first cell management apparatus 101 may further determine interference information according to the first measured value and the at least one second measured value, where the interference information may be an SNR (signal to noise ratio), an SIR (signal to interference ratio) or the like, and send the interference information to the interference coordination apparatus 103. The interference coordination apparatus 103 receives the interference information sent by the cell management apparatus of the first cell, and groups the multiple cells in the communications system into at least one cluster according to the interference information. The interference coordination apparatus 103 may be configured to coordinate transmit power of the multiple cells in a unit of cluster, so as to perform power coordination on a cluster including the first cell and at least one neighboring cell of the first cell.

signal Therefore, the transmit power of the multiple cells is coordinated more accurately, which reduces inter-cell interference more effectively.

Optionally, the configuration information of the uplink reference signal may include a time resource, a frequency resource, or a time-frequency resource used by the UE to send the uplink reference signal. In this way, the neighboring cell may measure, on a corresponding resource, the uplink reference signal sent by the UE.

Specifically, cell-level SRS configuration information is schematically shown in the following table:

| IE/Group Name | Presence | Range | IE type and reference | Semantics description | Criticality | Assigned Criticality |
|---|---|---|---|---|---|---|
| Serve Global eNB ID | M | | 9.2.22 | | YES | reject |
| Serve Local Cell ID | M | 0 to max local cell id | | | YES | |
| Serve Cell ID | M | 0 to max cell id | | | YES | |
| Rpt Global eNB ID | M | | 9.2.22 | | YES | |
| Rpt Cell ID | M | 0 to max cell id | | | YES | |
| Serve PCI | M | | INTEGER (0 . . . 503, . . . ) | Physical Cell Identifier of the neighbour cell (Physical Cell Identifier of the neighbour cell) | — | — |
| srs-BandwidthConfig | M | {bw0, bw1, bw2, bw3, bw4, bw5, bw6, bw7} | ENU-MERATED (ENU-MERATED) | | YES | |
| srs-SubframeConfig | M | sc0, sc1, sc2, sc3, sc4, sc5, sc6, sc7, sc8, sc9, sc10, sc11, sc12, sc13, sc14, sc15} | ENU-MERATED | | | |
| SrsSeq Hopping Enabled | M | | BOOLEAN (BOOLEAN) | | | |
| Srs Group Hopping Enabled | M | | BOOLEAN, | | | |
| groupAssignment PUSCH Rsv | M | (0 . . . 29) | INTEGER | | | |

Optionally, the uplink RS may be an uplink SRS (sounding reference signal), or may be another uplink RS. It should be understood that this is not limited in the embodiment of the present application. Besides, the measured value may be RSRP (reference signal received power) and/or RSRQ (reference signal received quality) of the uplink SRS. The measurement performed based on the uplink reference signal has higher stability and measurement accuracy than measurement performed based on a downlink reference The cell management apparatus of the first cell (a serving cell of the UE) obtains information about a list of neighboring cells (including identifiers of the cells and identifiers of base stations where the cells are located). When the cell management apparatus is located on a main control board of a base station, the cell management apparatus of the serving cell may send the cell-level SRS configuration information to the cell management apparatus of the neighboring cell through an x2 interface.

UE-level SRS configuration information is schematically shown in the following table:

| IE/Group Name | Presence | Range | IE type and reference | Semantics description | Criticality | Assigned Criticality |
|---|---|---|---|---|---|---|
| Serve Global eNB ID | M | | 36.423 9.2.22 | | YES | Reject |
| Serve Local Cell ID | M | 0 to max local cell id | | | YES | Reject |
| Rpt Global eNB ID | M | | 36.423 9.2.22 | | YES | |
| Rpt Cell ID | M | 0 to max cell id | INTEGER | | YES | |
| Cell Ue Inst | M | 0 to 65535 | INTEGER | | YES | — |
| Mac Ue ID | M | 0 to 65535 | INTEGER | | YES | |
| SRScExistFlag | M | | BOOLEAN | | YES | |
| Ue-srs-Bandwidth | M | bw0, bw1, bw2, bw3 | ENUMERATED | | YES | |
| srs-HoppingBandwidth | M | {hbw0, hbw1, hbw2, hbw3} | ENUMERATED | | YES | |
| transmissionComb | M | (0 . . . 1) | INTEGER | | YES | |
| freqDomainPosition | M | (0 . . . 23) | INTEGER | | YES | |
| cyclicShift | M | {cs0, cs1, cs2, cs3, cs4, cs5, cs6, cs7} | ENUMERATED | | YES | |
| srs-ConfigIndex | M | (0 . . . 1023) | INTEGER | | YES | |

The cell management apparatus of the first cell (a serving cell of the UE) obtains information about a list of neighboring cells (including identifiers of the cells and identifiers of base stations where the cells are located). When the cell management apparatus is located on a main control board of a base station, the cell management apparatus of the serving cell may send the UE-level SRS configuration information to the cell management apparatus of the neighboring cell through an x2 interface. When the SRS configuration information of the UE in the serving cell is changed, the serving cell needs to reconfigure the SRS configuration information to the neighboring cell. When the UE in the serving cell is released (disconnected), and the serving cell needs to instruct the neighboring cell to delete the SRS configuration information of the user equipment.

Figure 2:
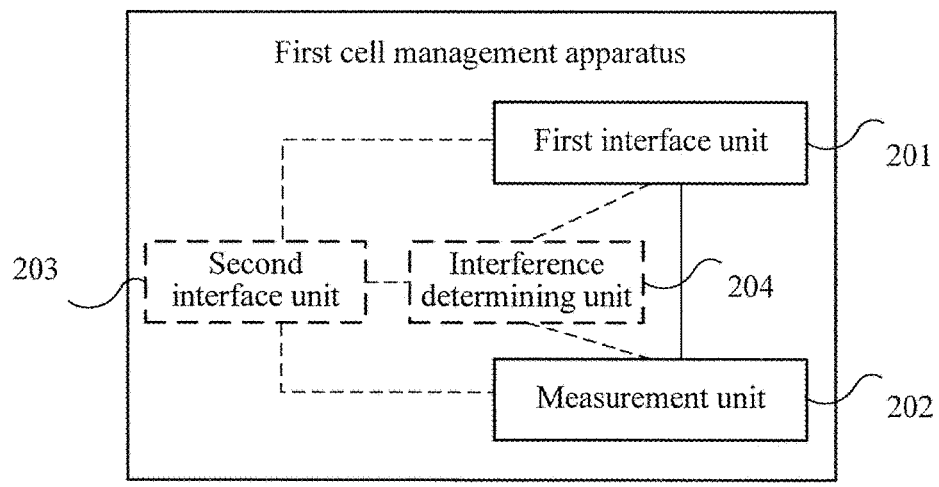
FIG. 2 is a schematic block diagram of a first cell management apparatus according to an embodiment of the present application.

FIG. 2 is a schematic block diagram of a cell management apparatus according to an embodiment of the present application. The cell management apparatus 200 is configured to manage a first cell in a communications system, where the communications system includes the first cell and at least one neighboring cell of the first cell, where each cell corresponds to one cell management apparatus, a cell management apparatus corresponding to the first cell is a first cell management apparatus, and a cell management apparatus corresponding to the neighboring cell of the first cell is a second cell management apparatus. It should be understood that each cell management apparatus may correspond to one or more cells, which is not limited in the embodiment of the present application.

The cell management apparatus 200 in FIG. 2 is an example of the first cell management apparatus in the foregoing interference coordination system. Therefore, a repeated description is omitted to a certain degree. The apparatus 200 includes a first interface unit 201, a measurement unit 202, and a second interface unit 203.

The first interface unit 201 is configured to send configuration information of an uplink reference signal to at least one second cell management apparatus, where the configuration information is used to indicate a position of a resource in which the uplink reference signal is located, so that each of the at least one second cell management apparatus measures, according to the configuration information and on the resource in which the uplink reference signal is located, the uplink reference signal sent by UE within the first cell, to obtain a second measured value.

The measurement unit 202 is configured to measure, according to the configuration information and on the resource in which the uplink reference signal is located, the uplink reference signal sent by the UE within the first cell, to obtain a first measured value.

The second interface unit 203 is configured to send the first measured value, which is obtained by the measurement unit 202 by measurement, to an interference coordination apparatus, so that the interference coordination apparatus coordinates downlink transmit power of the first cell and downlink transmit power of the at least one neighboring cell of the first cell according to the first measured value and at least one second measured value.

According to the foregoing solution, each cell management apparatus obtains a measured value based on an uplink reference signal sent by UE, in this way, not only interference from a neighboring cell of a cell to an edge UE in the cell but also interference from the neighboring cell to a non-edge UE in the cell can be considered, and an interference coordination apparatus coordinates transmit power of cells according to the measured values obtained based on the uplink reference signal, which can effectively reduce inter-cell interference. Besides, because the interference to the non-edge UE is considered, a throughput gain of UE which is near the center of the cell and is subject to weak interference can be improved, thereby increasing a network capacity.

It should be noted that the cell management apparatuses may send their respective measured values to the interference coordination apparatus separately, or may send their respective measured values to a cell management apparatus (for example, the first cell management apparatus) collectively, and the cell management apparatus then sends the measured values to the interference coordination apparatus. Besides, the measured values sent to the interference coordination apparatus may be values that are not processed, or may be values that are preprocessed, for example, values that undergo filtering processing.

Besides, the cell management apparatuses may send their respective measured values to the first interface unit 201, and then the measurement unit 202 processes the measured values and sends the measured values to the interference coordination apparatus. For example, the first cell management apparatus sorts the measurements values according to UE, and then sends the measured values to the interference coordination apparatus, so that the interference coordination apparatus can coordinate downlink transmit power according to measured values of each UE. Certainly, the measured values may not be processed by the measurement unit 202; in this case, the interference coordination apparatus needs to sort the measured values, so as to compute an MCS by using all measured values of a UE as an input, thereby determining a scheduling priority to determine optimal transmit power. In brief, a manner for reporting a measured value by each cell management apparatus is not limited in the embodiment of the present application; the cell management apparatuses may report their respective measured values to the interference coordination apparatus separately, or may report the measured values to the interference coordination apparatus by using a cell management apparatus. Besides, whether the reported measured values are processed is not limited either.

Optionally, the first interface unit 201 may be further configured to receive the second measured value sent by each second cell management apparatus. Further, the second interface unit is further configured to send at least one second measured value received by the first interface unit 201 to the interference coordination apparatus. The first cell management apparatus further includes an interference determining unit 204, where the interference determining unit 204 is configured to determine interference information according to the first measured value and the at least one second measured value, and the interference information may be an SNR, an SIR, or the like. The second interface unit 203 may be further configured to send the interference information to the interference coordination apparatus, so that the interference coordination apparatus groups multiple cells in the communications system into at least one cluster according to the interference information, where the first cell and at least one neighboring cell of the first cell belong to a same cluster.

Optionally, the uplink RS may be an uplink SRS, or may be another uplink RS. It should be understood that this is not limited in the embodiment of the present application. Besides, the measured value may be RSRP and/or RSRQ of the uplink SRS. The measurement performed based on the uplink reference signal has higher stability and measurement accuracy than measurement performed based on a downlink reference signal. Therefore, the transmit power of the multiple cells is coordinated more accurately, which reduces inter-cell interference more effectively.

Optionally, the configuration information of the uplink reference signal may include a time resource, a frequency resource, or a time-frequency resource used by the UE to send the uplink reference signal. In this way, the neighboring cell may measure, on a corresponding resource, the uplink reference signal sent by the UE.

Figure 3:
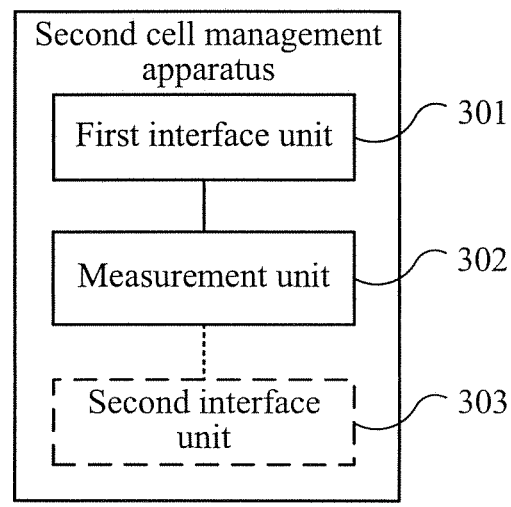
FIG. 3 is a schematic block diagram of a second cell management apparatus according to an embodiment of the present application.

FIG. 3 is a schematic block diagram of a cell management apparatus according to an embodiment of the present application. The cell management apparatus 300 is configured to manage a neighboring cell of a first cell in a communications system.

The cell management apparatus 300 in FIG. 3 is an example of the second cell management apparatus in the foregoing interference coordination system. Therefore, a repeated description is omitted to a certain degree. The apparatus 300 includes a first interface unit 301 and a measurement unit 302. The communications system includes the first cell and at least one neighboring cell of the first cell, where each cell corresponds to one cell management apparatus, a cell management apparatus corresponding to the first cell is a first cell management apparatus, and a cell management apparatus corresponding to the neighboring cell of the first cell is a second cell management apparatus. It should be understood that each cell management apparatus may correspond to one or more cells, which is not limited in the embodiment of the present application.

The first interface unit 301 is configured to receive configuration information, of an uplink reference signal, sent by the first cell management apparatus, where the configuration information is used to indicate a position of a resource in which the uplink reference signal is located.

The measurement unit 302 is configured to measure, according to the configuration information received by the first interface unit 301 and on the resource in which the uplink reference signal is located, the uplink reference signal sent by UE within the first cell, to obtain a second measured value, where the second measured value is used by an interference coordination apparatus to coordinate downlink transmit power of the first cell and downlink transmit power of the at least one neighboring cell of the first cell.

According to the foregoing solution, each cell management apparatus obtains a measured value based on an uplink reference signal sent by UE, in this way, not only interference from a neighboring cell of a cell to an edge UE in the cell but also interference from the neighboring cell to a non-edge UE in the cell can be considered, and an interference coordination apparatus coordinates transmit power of cells according to the measured values obtained based on the uplink reference signal, which can effectively reduce inter-cell interference. Besides, because the interference to the non-edge UE is considered, a throughput gain of UE which is near the center of the cell and is subject to weak interference can be improved, thereby increasing a network capacity.

It should be noted that the cell management apparatuses may send their respective measured values to the interference coordination apparatus separately, or may send their respective measured values to a cell management apparatus (for example, the first cell management apparatus) collectively, and the cell management apparatus then sends the measured values to the interference coordination apparatus. Besides, the measured values sent to the interference coordination apparatus may be values that are not processed, or may be values that are preprocessed, for example, values that undergo filtering processing.

A manner for reporting a measured value by each cell management apparatus is not limited in the embodiment of the present application; the cell management apparatuses may report their respective measured values to the interference coordination apparatus separately, or may report the measured values to the interference coordination apparatus by using a cell management apparatus. Besides, whether the reported measured values are processed is not limited either.

Optionally, in an implementation manner, the cell management apparatus 300 may further include a second interface unit 302, where the second interface unit 302 is configured to send the second measured value to the interference coordination apparatus.

Optionally, in another implementation manner, the first interface unit 301 may be further configured to send the second measured value to the first cell management apparatus, where the second measured value is sent by the first cell management apparatus to the interference coordination apparatus, or the second measured value is used by the first cell management apparatus to determine interference information, so that the interference coordination apparatus groups multiple cells in the communications system into at least one cluster according to the interference information, where the first cell and at least one neighboring cell of the first cell belong to a same cluster.

Optionally, the uplink RS may be an uplink SRS, or may be another uplink RS. It should be understood that this is not limited in the embodiment of the present application. Besides, the measured value may be RSRP and/or RSRQ of the uplink SRS. The measurement performed based on the uplink reference signal has higher stability and measurement accuracy than measurement performed based on a downlink reference signal. Therefore, the transmit power of the multiple cells is coordinated more accurately, which reduces inter-cell interference more effectively.

Optionally, the configuration information of the uplink reference signal may include a time resource, a frequency resource, or a time-frequency resource used by the UE to send the uplink reference signal. In this way, the neighboring cell may measure, on a corresponding resource, the uplink reference signal sent by the UE.

Figure 4:
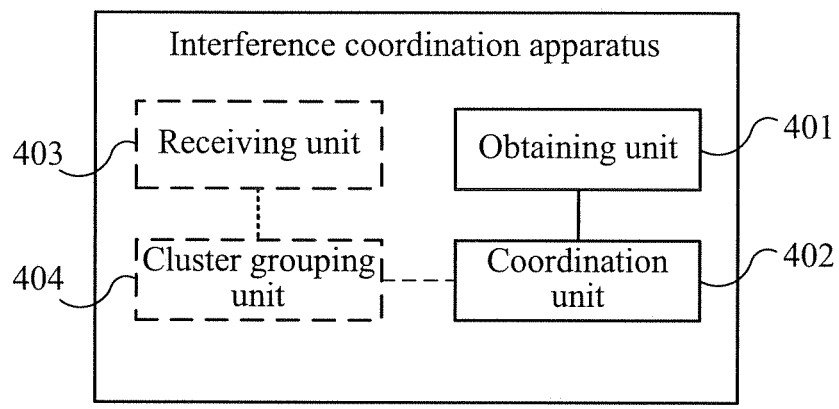
FIG. 4 is a schematic block diagram of an interference coordination apparatus according to an embodiment of the present application.

FIG. 4 is a schematic block diagram of an interference coordination apparatus according to an embodiment of the present application. The interference coordination apparatus 400 is configured to coordinate downlink transmit power of multiple cells in a communications system, where the multiple cells include a first cell and at least one neighboring cell of the first cell, where each cell corresponds to one cell management apparatus, a cell management apparatus corresponding to the first cell is a first cell management apparatus, and a cell management apparatus corresponding to the neighboring cell of the first cell is a second cell management apparatus. It should be understood that each cell management apparatus may correspond to one or more cells, which is not limited in the embodiment of the present application.

The interference coordination apparatus 400 is an example of the interference coordination apparatus in the foregoing interference coordination system. Therefore, a repeated description is omitted to a certain degree. The apparatus 400 includes an obtaining unit 401 and a coordination unit 402.

The obtaining unit 401 is configured to obtain a first measured value and at least one second measured value, where the first measured value is obtained by the first cell management apparatus by measurement, on a resource in which an uplink reference signal is located, the uplink reference signal sent by UE within the first cell, and the at least one second measured value is obtained by at least one second cell management apparatus by measurement, on the resource in which the uplink reference signal is located, the uplink reference signal sent by the UE within the first cell.

The coordination unit 402 is configured to coordinate downlink transmit power of the first cell and downlink transmit power of the at least one neighboring cell of the first cell according to the first measured value and the at least one second measured value.

According to the foregoing solution, each cell management apparatus obtains a measured value based on an uplink reference signal sent by UE, in this way, not only interference from a neighboring cell of a cell to an edge UE in the cell but also interference from the neighboring cell to a non-edge UE in the cell can be considered; and an interference coordination apparatus coordinates transmit power of cells according to the measured values obtained based on the uplink reference signal, which effectively reduces inter-cell interference. Besides, because the interference to the non-edge UE is considered, a throughput gain of UE which is near the center of the cell and is subject to weak interference can be improved, thereby increasing a network capacity.

It should be noted that the cell management apparatuses may send their respective measured values to the interference coordination apparatus separately, or may send their respective measured values to a cell management apparatus (for example, the first cell management apparatus) collectively, and the cell management apparatus then sends the measured values to the interference coordination apparatus. Besides, the measured values sent to the interference coordination apparatus may be values that are not processed, or may be values that are preprocessed, for example, values that undergo filtering processing.

A manner for reporting a measured value by each cell management apparatus is not limited in the embodiment of the present application; the cell management apparatuses may report their respective measured values to the interference coordination apparatus separately, or may report the measured values to the interference coordination apparatus by using a cell management apparatus. Besides, whether the reported measured values are processed is not limited either.

Optionally, the obtaining unit 401 may be specifically configured to obtain the first measured value and the at least one second measured value from the first cell management apparatus; or the obtaining unit 401 may be specifically configured to obtain the first measured value from the first cell management apparatus and obtain the at least one second measured value from the at least one second cell management apparatus.

Optionally, the apparatus 400 may further include a receiving unit 403 and a clustering unit 404. The receiving unit 403 is configured to receive interference information sent by the first cell management apparatus. The interference information includes but is not limited to an SNR, an SIR, or the like. The clustering unit 404 is configured to group the multiple cells in the communications system into at least one cluster according to the interference information received by the receiving unit 403, where the first cell and at least one neighboring cell of the first cell belong to a same cluster.

Optionally, the uplink RS may be an uplink SRS, or may be another uplink RS. It should be understood that this is not limited in the embodiment of the present application. Besides, the measured value may be RSRP and/or RSRQ of the uplink SRS. The measurement performed based on the uplink reference signal has higher stability and measurement accuracy than measurement performed based on a downlink reference signal. Therefore, the transmit power of the multiple cells is coordinated more accurately, which reduces inter-cell interference more effectively.

Optionally, the configuration information of the uplink reference signal may include a time resource, a frequency resource, or a time-frequency resource used by the UE to send the uplink reference signal. In this way, the neighboring cell may measure, on a corresponding resource, the uplink reference signal sent by the UE.

The technical solutions of the embodiments of the present application may be applied to different scenarios, and the following exemplarily describes a diagram of a scenario and a system deployment to which the embodiments of the present application can be applied.

Optionally, when a communications network uses a distributed base station networking mode, and has a coordinator deployed, base stations in the communications network are connected to the coordinator, a first cell management apparatus and at least one second cell management apparatus are separately located in the base stations in the communications network, and an interference coordination apparatus is located in the coordinator. Optionally, the base stations are interconnected by using x2 interfaces, that is, exchange information by using the x2 interfaces. Alternatively, when baseband processing units BBUs of base stations in a communications network are placed together (Cloud BB), a first cell management apparatus and at least one second cell management apparatus are separately located in the BBUs that are placed together, and an interference coordination apparatus is located in a BBU (a first BBU) of the BBUs that are placed together. Optionally, the BBUs are interconnected through interconnect interfaces.

Figure 5:
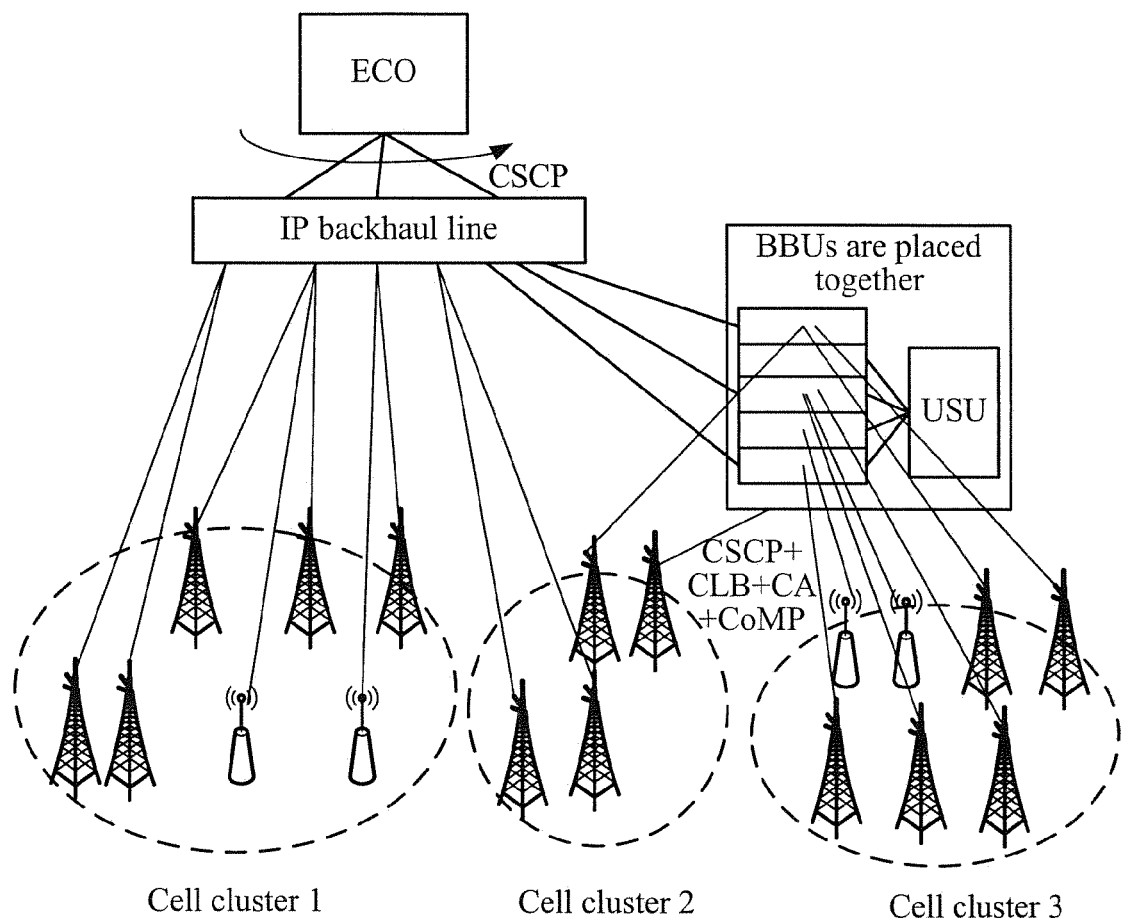
FIG. 5 is a schematic diagram of a communications network scenario which can be applied to an embodiment of the present application.

Specifically, as shown in a network scenario shown in FIG. 5, distributed base stations are connected to an ECO by using an IP backhaul line, a cell management apparatus of each cell is located in a base station corresponding to the cell. An interference coordination apparatus is deployed in the ECO. Optionally, a clustering unit may be deployed in the ECO. In this scenario, the interference coordination apparatus coordinates downlink transmit power of multiple cells in each cell cluster (which is also referred to as CSPC scheduling), where two cell clusters are cells in cell cluster 1 and a part of cells in cell cluster 2 separately. In another Cloud BB networking scenario, BBUs of base stations in a network are placed together and are connected to a USU (universal switching unit), and are connected to RRUs by using optical fibers. A cell management apparatus of each cell is located in a BBU corresponding to the cell. An interference coordination apparatus is deployed in a BBU selected from the Cloud BB. Optionally, a clustering unit may be deployed in the BBU. In the Cloud BB scenario, two cell clusters are also shown, which are separately cell cluster 3 and a part of the cells in cell cluster 2. That is, CSPC scheduling of the cells in cell cluster 2 may be jointly performed by the ECO and the BBUs. The ECO can implement centralized scheduling on a large scale (larger than a certain coverage area or a quantity of cells) at a slow speed (for example, 20 ms to 40 ms), and the Cloud BB can implement centralized scheduling on a small scale at a fast speed (for example, 1 ms to 5 ms). A first cell and a neighboring cell of the first cell described in the embodiment of the present application both belong to a same cluster.

It should be noted that the scenario diagram in FIG. 5 is merely exemplary; the number of cell clusters, the number of cells included in each cluster, the number of base stations, the number of cells under one base station, and the number of BBUs are not limited in the embodiment of the present application; a base station type may be a macro base station, a micro base station, a pico base station, a femto base station, a home base station, or the like, which is not limited in the embodiment of the present application either.

Figure 6:
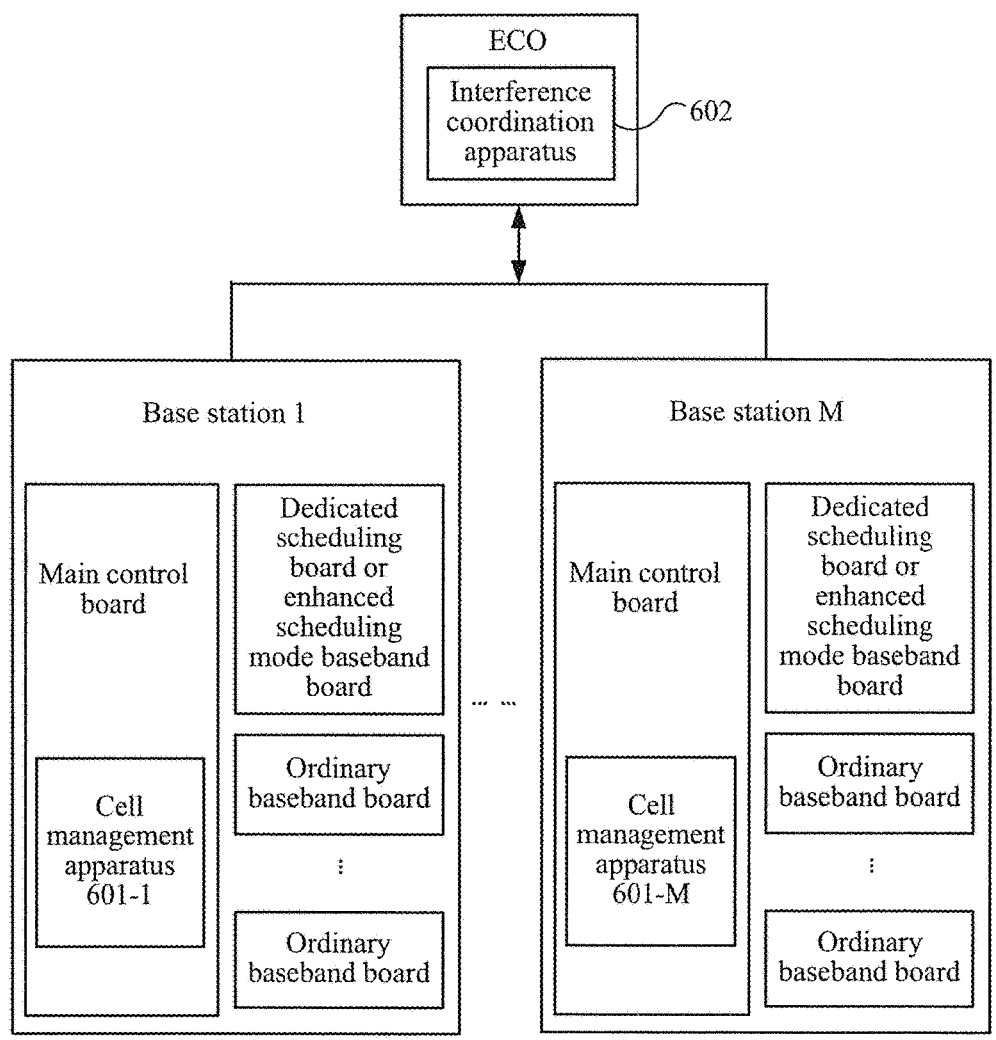
FIG. 6 is a schematic block diagram of a deployment of an interference coordination system according to an embodiment of the present application.

As an example, in a case in which a coordinator performs CSPC scheduling, a schematic diagram of an interference coordination system is shown in FIG. 6. In the diagram, an ECO includes an interference coordination apparatus. Each distributed base station has a cell management apparatus deployed therein. It should be noted that serving base stations of different cells may be the same or different. It should also be noted that the cell management apparatuses in the diagram are deployed on main control boards. It should be understood that functions implemented by units in the cell management apparatuses are merely logical function division, and may be combined or integrated into a physical entity in actual implementation, or may be physically separated and distributed in different network devices or different positions of a same network device. For example, a cell management apparatus may be deployed on a baseband board of a base station, or units which are included in a cell management apparatus and implement different functions are distributed in different positions of a base station.

For ease of understanding, that serving base stations corresponding to different cells are different is used herein as an example for description. It is assumed that a serving cell of UE is a first cell, a serving base station of the first cell is base station 1, the first cell has M−1 neighboring cells, where M is an integer greater than or equal to 2, and serving base stations of the M−1 neighboring cells are base station 2, base station 3, . . . , and base station M. The UE may be edge UE, or may be non-edge UE. An uplink SRS is used as an example of an uplink RS, but the present application is not limited thereto.

A first cell management apparatus 601-1 may be configured to measure an uplink RS of UE in the cell, to obtain a first measured value, and separately send configuration information of the uplink SRS of the UE to M−1 second cell management apparatuses in a one-to-one correspondence with the M−1 neighboring cells through an x2 interface. Optionally, the configuration information of the uplink SRS may include cell-level SRS configuration information and UE-level SRS configuration information, where the cell-level SRS configuration information indicates resources which can be used by all UEs in the first cell to send uplink RSs, and the UE-level SRS configuration information indicates a resource used by a UE to send an uplink RS. Specifically, the resource may be a time resource, a frequency resource or a time-frequency resource. Each second cell management apparatus is configured to measure, according to the configuration information of the uplink SRS and on a corresponding resource, the uplink SRS sent by the UE, to obtain a second measured value (for example, RSRP of the uplink SRS), which may optionally be sent to the first cell management apparatus 601-1 through an x2 interface or directly sent to an interference coordination apparatus. The first cell management apparatus 601-1 may be further configured to determine interference information according to the first measured value and M−1 second measured values, and send the interference information to the interference coordination apparatus 602. The interference coordination apparatus 602 is configured to determine downlink transmit power of the M cells according to the first measured value and the M−1 second measured values, and may be further configured to group multiple cells in a communications system into clusters according to the interference information.

Figure 7:
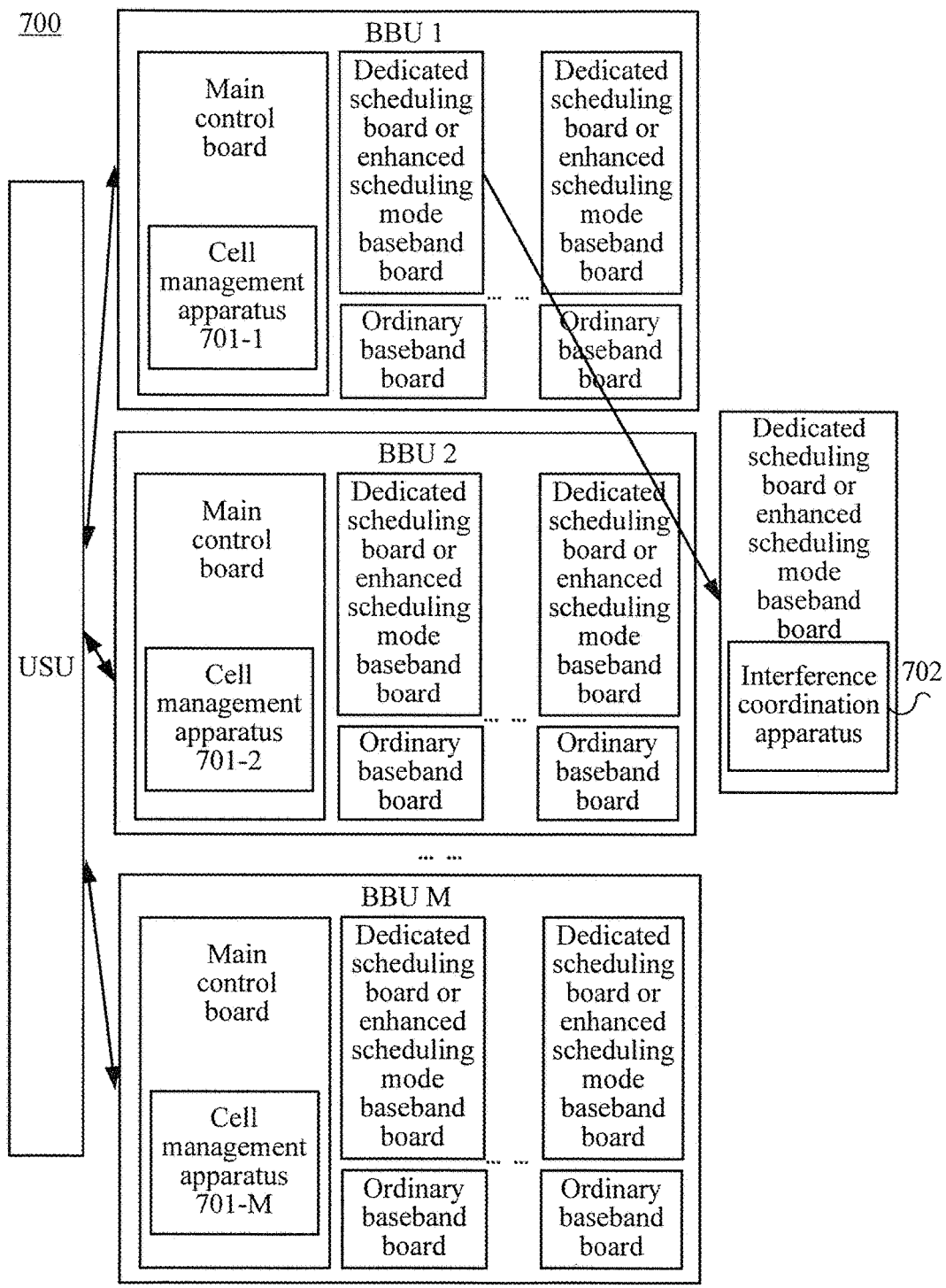
FIG. 7 is a schematic block diagram of a deployment of an interference coordination system according to another embodiment of the present application.

As an example, in a case in which a BBU performs CSPC scheduling, for example, in the foregoing Cloud BB scenario, a schematic diagram of an interference coordination system is shown in FIG. 7. In the figure, an interference coordination apparatus 702 is deployed on a baseband board of a BBU, for example, BBU 1, where the BBU may be an ordinary baseband board or may be a dedicated baseband board, and each BBU has a cell management apparatus deployed therein. The BBUs may exchange information through interconnect interfaces. Optionally, the interference coordination apparatus 702 may be located on an ordinary baseband board or a dedicated baseband board of the first BBU, and the cell management apparatuses may be deployed on main control boards, ordinary baseband boards or dedicated baseband boards of the BBUs.

It should be noted that serving base stations of different cells may be the same or different, that is, BBUs of different cells may be the same or different. It should be understood that functions implemented by units in the cell management apparatuses are merely logical function division, and may be combined or integrated into a physical entity in actual implementation, or may be physically separated and distributed in different network devices or different positions of a same network device. For example, the base stations or the main control boards of the BBUs may exchange the configuration information of the uplink RS, and the base stations or the baseband boards of the BBUs may measure the uplink RS of the UE. It should be understood that the embodiment of the present application is not limited thereto. Similarly, for a specific embodiment, reference may be made to the example in FIG. 6, which is not described repeatedly herein.

It should be noted that the interface units in the foregoing embodiment (including a first interface unit and a second interface) may be interface circuits. A measurement unit may be a processor arranged independently, or may be implemented by being integrated into a processor of a base station; besides, the measurement unit may also be stored, in a form of program code, in a memory of a base station, so that a processor of the base station invokes the program code and performs functions of the foregoing measurement unit. Implementation of an interference determining unit, an obtaining unit, a clustering unit, and a coordination unit is the same as that of the measurement unit. The processor described herein may be a central processing unit (CPU), or may be an application specific integrated circuit (ASIC), or may be one or more integrated circuits configured to implement the embodiment of the present application.

Figure 8:
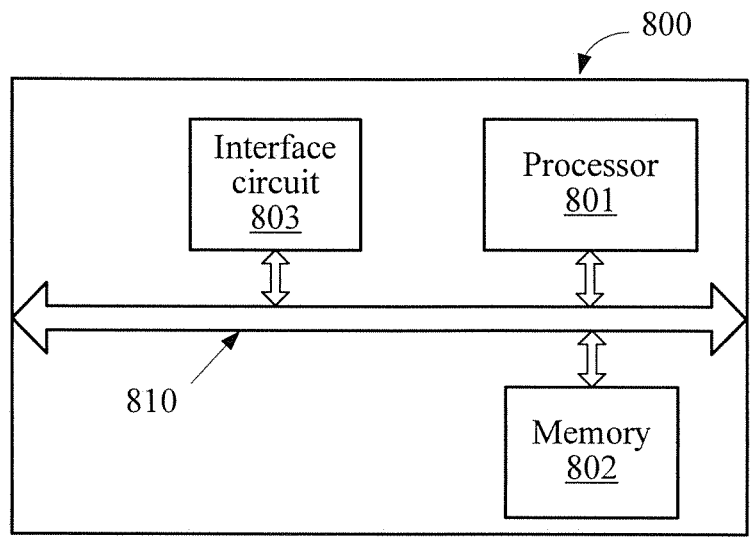
FIG. 8 is a schematic block diagram of a first cell management apparatus according to another embodiment of the present application.

FIG. 8 is a schematic structural diagram of a cell management apparatus according to another embodiment of the present application. The cell management apparatus 800 is configured to manage a first cell in a communications system, where the communications system includes the first cell and at least one neighboring cell of the first cell, where each cell corresponds to one cell management apparatus, a cell management apparatus corresponding to the first cell is a first cell management apparatus, and a cell management apparatus corresponding to the neighboring cell of the first cell is a second cell management apparatus. It should be understood that each cell management apparatus may correspond to one or more cells, which is not limited in the embodiment of the present application.

The cell management apparatus 800 in FIG. 8 is an example of the cell management apparatus of the first cell in the foregoing interference coordination system, and includes a processor 801, a memory 802, and an interface circuit 803. The processor 801 controls an operation of the apparatus 800. The processor may be a CPU, an application specific integrated circuit (ASIC), or one or more integrated circuits configured to implement the embodiment of the present application. The memory 802 may include a read only memory and a random access memory, and provide an instruction and data for the processor 801. A part of the memory 802 may further include a non-volatile random access memory. The processor 801, the memory 802, and the interface circuit 803 are coupled together by using a bus system 810, where besides a data bus, the bus system 810 further includes a power source bus, a control bus, and a state signal bus. However, for ease of clear description, the various buses are all marked as the bus system 810 in the diagram.

A function relevant to a cell management apparatus in the system for managing a cell in the foregoing embodiment of the present application may be implemented by using the foregoing cell management apparatus 800. The processor 801 may be an integrated circuit chip having a signal processing capacity. In an implementation process, the steps of the foregoing method may be performed by using a hardware integrated logic circuit in the processor 801 or an instruction in a form of software. The foregoing processor 801 may be a general-purpose processor, including a CPU, an NP, or the like, or may be a DSP, an ASIC, an FPGA or another programmable logic device, a discrete gate or a transistor logic device, or a discrete hardware component. The processor may implement or execute the methods, the steps, and the logic block diagrams disclosed in the embodiments of the present application. The general-purpose processor may be a microprocessor, or the processor may also be any conventional processor.

In this embodiment, the interface circuit 803 is configured to send configuration information of an uplink reference signal to at least one second cell management apparatus, where the configuration information is used to indicate a position of a resource in which the uplink reference signal is located, so that each of the at least one second cell management apparatus measures, according to the configuration information and on the resource in which the uplink reference signal is located, the uplink reference signal sent by UE within the first cell, to obtain a second measured value. The processor 801 is configured to measure, according to the configuration information and on the resource in which the uplink reference signal is located, the uplink reference signal sent by the UE within the first cell, to obtain a first measured value. The interface circuit 803 is further configured to send the first measured value to an interference coordination apparatus, so that the interference coordination apparatus coordinates downlink transmit power of the first cell and downlink transmit power of the at least one neighboring cell of the first cell according to the first measured value and at least one second measured value.

According to the foregoing solution, each cell management apparatus obtains a measured value based on an uplink reference signal sent by UE, in this way, not only interference from a neighboring cell of a cell to an edge UE in the cell but also interference from the neighboring cell to a non-edge UE in the cell can be considered, and an interference coordination apparatus coordinates transmit power of cells according to the measured values obtained based on the uplink reference signal, which can effectively reduce inter-cell interference. Besides, because the interference to the non-edge UE is considered, a throughput gain of UE which is near the center of the cell and is subject to weak interference can be improved, thereby increasing a network capacity.

It should be noted that the cell management apparatuses may send their respective measured values to the interference coordination apparatus separately, or may send their respective measured values to a cell management apparatus (for example, the first cell management apparatus) collectively, and the cell management apparatus then sends the measured values to the interference coordination apparatus. Besides, the measured values sent to the interference coordination apparatus may be values that are not processed, or may be values that are preprocessed, for example, values that undergo filtering processing.

Besides, the cell management apparatuses may send their respective measured values to the interface circuit 803, and the processor 801 processes the measured values and then sends the measured values to the interference coordination apparatus. For example, the first cell management apparatus sorts the measurements values according to UE, and then sends the measured values to the interference coordination apparatus, so that the interference coordination apparatus can coordinate downlink transmit power according to measured values of each UE. Certainly, the measured values may not be processed by the processor 801; in this case, the interference coordination apparatus needs to sort the measured values, so as to compute an MCS by using all measured values of a UE as an input, thereby determining a scheduling priority to determine optimal transmit power. In brief, a manner for reporting a measured value by each cell management apparatus is not limited in the embodiment of the present application; the cell management apparatuses may report their respective measured values to the interference coordination apparatus separately, or may report the measured values to the interference coordination apparatus by using a cell management apparatus. Besides, whether the reported measured values are processed is not limited either.

Optionally, the interface circuit 803 may be further configured to receive the second measured value sent by each second cell management apparatus. Further, the second interface unit is further configured to send at least one second measured value received by the interface circuit 803 to the interference coordination apparatus. The processor 801 may be further configured to determine interference information according to the first measured value and the at least one second measured value, where the interference information may be an SNR, an SIR, or the like. The interface circuit 803 may be further configured to send the interference information to the interference coordination apparatus, so that the interference coordination apparatus groups multiple cells in the communications system into at least one cluster according to the interference information, where the first cell and at least one neighboring cell of the first cell belong to a same cluster.

Optionally, the uplink RS may be an uplink SRS, or may be another uplink RS. It should be understood that this is not limited in the embodiment of the present application. Besides, the measured value may be RSRP and/or RSRQ of the uplink SRS. The measurement performed based on the uplink reference signal has higher stability and measurement accuracy than measurement performed based on a downlink reference signal. Therefore, the transmit power of the multiple cells is coordinated more accurately, which reduces inter-cell interference more effectively.

Optionally, the configuration information of the uplink reference signal may include a time resource, a frequency resource, or a time-frequency resource used by the UE to send the uplink reference signal. In this way, the neighboring cell may measure, on a corresponding resource, the uplink reference signal sent by the UE.

Figure 9:
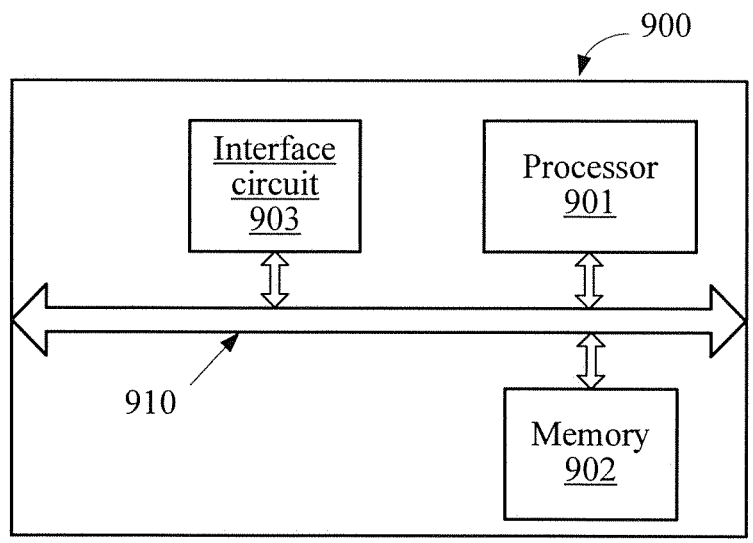
FIG. 9 is a schematic block diagram of a second cell management apparatus according to another embodiment of the present application.

FIG. 9 is a schematic structural diagram of a cell management apparatus according to another embodiment of the present application. The cell management apparatus 900 is configured to manage a neighboring cell of a first cell in a communications system, where the communications system includes the first cell and at least one neighboring cell of the first cell, where each cell corresponds to one cell management apparatus, a cell management apparatus corresponding to the first cell is a first cell management apparatus, and a cell management apparatus corresponding to the neighboring cell of the first cell is a second cell management apparatus. It should be understood that each cell management apparatus may correspond to one or more cells, which is not limited in the embodiment of the present application.

The cell management apparatus 900 in FIG. 9 is an example of the second cell management apparatus in the foregoing interference coordination system. The apparatus 900 includes a processor 901, a memory 902, and an interface circuit 903. The processor 901 controls an operation of the apparatus 900. The processor may be a CPU, an application specific integrated circuit (ASIC), or one or more integrated circuits configured to implement the embodiment of the present application. The memory 902 may include a read-only memory and a random access memory, and provide an instruction and data for the processor 901. A part of the memory 902 may further include a non-volatile random access memory. The processor 901, the memory 902, and the interface circuit 903 are coupled together by using a bus system 910, where besides a data bus, the bus system 910 further includes a power source bus, a control bus, and a state signal bus. However, for ease of clear description, the various buses are all marked as the bus system 910 in the diagram.

A function relevant to a cell management apparatus in the system for managing a neighboring cell of a cell in the foregoing embodiment of the present application may be implemented by using the foregoing cell management apparatus 900. The processor 901 may be an integrated circuit chip having a signal processing capacity. In an implementation process, the steps of the foregoing method may be performed by using a hardware integrated logic circuit in the processor 901 or an instruction in a form of software. The foregoing processor 901 may be a general-purpose processor, including a CPU, an NP, or the like, or may be a DSP, an ASIC, an FPGA or another programmable logic device, a discrete gate or a transistor logic device, or a discrete hardware component. The processor may implement or execute the methods, the steps, and the logic block diagrams disclosed in the embodiments of the present application. The general-purpose processor may be a microprocessor, or the processor may also be any conventional processor.

In this embodiment, the interface circuit 903 is configured to receive configuration information, of an uplink reference signal, sent by the first cell management apparatus, where the configuration information is used to indicate a position of a resource in which the uplink reference signal is located. The processor 901 is configured to measure, according to the configuration information received by the interface circuit 903 and on the resource in which the uplink reference signal is located, the uplink reference signal sent by UE within the first cell, to obtain a second measured value, where the second measured value is used by an interference coordination apparatus to coordinate downlink transmit power of the first cell and downlink transmit power of the at least one neighboring cell of the first cell.

According to the foregoing solution, each cell management apparatus obtains a measured value based on an uplink reference signal sent by UE, not only interference from a neighboring cell of a cell to an edge UE in the cell but also interference from the neighboring cell to a non-edge UE in the cell can be considered, and an interference coordination apparatus coordinates transmit power of cells according to the measured values obtained based on the uplink reference signal, which can effectively reduce inter-cell interference. Besides, because the interference to the non-edge UE is considered, a throughput gain of UE which is near the center of the cell and is subject to weak interference can be improved, thereby increasing a network capacity.

It should be noted that the cell management apparatuses may send their respective measured values to the interference coordination apparatus separately, or may send their respective measured values to a cell management apparatus (for example, the first cell management apparatus) collectively, and the cell management apparatus then sends the measured values to the interference coordination apparatus. Besides, the measured values sent to the interference coordination apparatus may be values that are not processed, or may be values that are preprocessed, for example, values that undergo filtering processing.

A manner for reporting a measured value by each cell management apparatus is not limited in the embodiment of the present application; the cell management apparatuses may report their respective measured values to the interference coordination apparatus separately, or may report the measured values to the interference coordination apparatus by using a cell management apparatus. Besides, whether the reported measured values are processed is not limited either.

Optionally, in an implementation manner, the interface circuit 903 may be further configured to send the second measured value to the interference coordination apparatus.

Optionally, in another implementation manner, the interface circuit 903 may be further configured to send the second measured value to the first cell management apparatus, where the second measured value is sent by the first cell management apparatus to the interference coordination apparatus, or the second measured value is used by the first cell management apparatus to determine interference information, so that the interference coordination apparatus groups multiple cells in the communications system into at least one cluster according to the interference information, where the first cell and at least one neighboring cell of the first cell belong to a same cluster.

Optionally, the uplink RS may be an uplink SRS, or may be another uplink RS. It should be understood that this is not limited in the embodiment of the present application. Besides, the measured value may be RSRP and/or RSRQ of the uplink SRS. The measurement performed based on the uplink reference signal has higher stability and measurement accuracy than measurement performed based on a downlink reference signal. Therefore, the transmit power of the multiple cells is coordinated more accurately, which reduces inter-cell interference more effectively.

Optionally, the configuration information of the uplink reference signal may include a time resource, a frequency resource, or a time-frequency resource used by the UE to send the uplink reference signal. In this way, the neighboring cell may measure, on a corresponding resource, the uplink reference signal sent by the UE.

FIG. 10 is a schematic structural diagram of an interference coordination apparatus according to another embodiment of the present application. The interference coordination apparatus 1000 is configured to coordinate downlink transmit power of multiple cells in a communications system, where the multiple cells include a first cell and at least one neighboring cell of the first cell, where each cell corresponds to one cell management apparatus, a cell management apparatus corresponding to the first cell is a first cell management apparatus, and a cell management apparatus corresponding to the neighboring cell of the first cell is a second cell management apparatus. It should be understood that each cell management apparatus may correspond to one or more cells, which is not limited in the embodiment of the present application.

The interference coordination apparatus 1000 in FIG. 10 is an example of the interference coordination apparatus in the foregoing interference coordination system. The apparatus 1000 includes a processor 1001, a memory 1002, an interface circuit 1003, and a transceiver. The processor 1001 controls an operation of the apparatus 1000. The processor may be a CPU, an application specific integrated circuit (ASIC), or one or more integrated circuits configured to implement the embodiment of the present application. The memory 1002 may include a read only memory and a random access memory, and provide an instruction and data for the processor 1001. A part of the memory 1002 may further include a non-volatile random access memory. The processor 1001, the memory 1002, the interface circuit 1003, and the transceiver are coupled together by using a bus system 1010, where besides a data bus, the bus system 1010 further includes a power source bus, a control bus, and a state signal bus. However, for ease of clear description, the various buses are all marked as the bus system 1010 in the diagram.

A function relevant to a interference coordination apparatus in the system for coordinating downlink transmit power of multiple cells in the foregoing embodiment of the present application may be implemented by using the foregoing interference coordination apparatus 1000. The processor 1001 may be an integrated circuit chip having a signal processing capacity. In an implementation process, the steps of the foregoing method may be performed by using a hardware integrated logic circuit in the processor 1001 or an instruction in a form of software. The foregoing processor 1001 may be a general-purpose processor, including a CPU, an NP, or the like, or may be a DSP, an ASIC, an FPGA or another programmable logic device, a discrete gate or a transistor logic device, or a discrete hardware component. The processor may implement or execute the methods, the steps, and the logic block diagrams disclosed in the embodiments of the present application. The general-purpose processor may be a microprocessor, or the processor may also be any conventional processor.

In this embodiment, the processor 1001 is configured to obtain a first measured value and at least one second measured value by using the interface circuit 1003, where the first measured value is obtained by the first cell management apparatus by measurement, on a resource in which an uplink reference signal is located, the uplink reference signal sent by UE within the first cell, and the at least one second measured value is obtained by at least one second cell management apparatus separately corresponding to the at least one neighboring cell of the first cell by measurement, on the resource in which the uplink reference signal is located, the uplink reference signal sent by the UE within the first cell. The processor 1001 is further configured to coordinate downlink transmit power of the first cell and downlink transmit power of the at least one neighboring cell of the first cell according to the first measured value and the at least one second measured value.

According to the foregoing solution, each cell management apparatus obtains a measured value based on an uplink reference signal sent by UE, in this way, not only interference from a neighboring cell of a cell to an edge UE in the cell but also interference from the neighboring cell to a non-edge UE in the cell can be considered; and an interference coordination apparatus coordinates transmit power of cells according to the measured values obtained based on the uplink reference signal, which effectively reduces inter-cell interference. Besides, because the interference to the non-edge UE is considered, a throughput gain of UE which is near the center of the cell and is subject to weak interference can be improved, thereby increasing a network capacity.

It should be noted that the cell management apparatuses may send their respective measured values to the interference coordination apparatus separately, or may send their respective measured values to a cell management apparatus (for example, the first cell management apparatus) collectively, and the cell management apparatus then sends the measured values to the interference coordination apparatus. Besides, the measured values sent to the interference coordination apparatus may be values that are not processed, or may be values that are preprocessed, for example, values that undergo filtering processing.

A manner for reporting a measured value by each cell management apparatus is not limited in the embodiment of the present application; the cell management apparatuses may report their respective measured values to the interference coordination apparatus separately, or may report the measured values to the interference coordination apparatus by using a cell management apparatus. Besides, whether the reported measured values are processed is not limited either.

Optionally, the processor 1001 may be specifically configured to obtain the first measured value and the at least one second measured value from the first cell management apparatus by using the interface circuit 1003; or the processor 1001 may be specifically configured to obtain the first measured value from the first cell management apparatus by using the interface circuit 1003 and obtain the at least one second measured value from the at least one second cell management apparatus.

Optionally, the transceiver 1004 may be further configured to receive interference information sent by the first cell management apparatus. The interference information includes but is not limited to an SNR, an SIR, or the like. The processor 1001 is configured to group the multiple cells in the communications system into at least one cluster according to the interference information received by the interface circuit 1003, where the first cell and at least one neighboring cell of the first cell belong to a same cluster.

Optionally, the uplink RS may be an uplink SRS, or may be another uplink RS. It should be understood that this is not limited in the embodiment of the present application. Besides, the measured value may be RSRP and/or RSRQ of the uplink SRS. The measurement performed based on the uplink reference signal has higher stability and measurement accuracy than measurement performed based on a downlink reference signal. Therefore, the transmit power of the multiple cells is coordinated more accurately, which reduces inter-cell interference more effectively.

Optionally, the configuration information of the uplink reference signal may include a time resource, a frequency resource, or a time-frequency resource used by the UE to send the uplink reference signal. In this way, the neighboring cell may measure, on a corresponding resource, the uplink reference signal sent by the UE.

FIG. 11 is a flowchart of an interference coordination method according to an embodiment of the present application. The method in FIG. 11 may be implemented by the foregoing interference coordination system. Therefore, a repeated description is omitted to a certain degree. The method is applicable to a communications system, where the communications system includes a first cell and at least one neighboring cell of the first cell, where each cell corresponds to one cell management apparatus, a cell management apparatus corresponding to the first cell is a first cell management apparatus, and a cell management apparatus corresponding to the neighboring cell of the first cell is a second cell management apparatus. It should be noted that in the embodiment of the present application, each cell management apparatus may correspond to one or more cells.

1101: The first cell management apparatus sends configuration information of an uplink reference signal to at least one second cell management apparatus, where the configuration information is used to indicate a position of a resource in which the uplink reference signal is located, and measures, on the resource in which the uplink reference signal is located, the uplink reference signal sent by UE within the first cell, to obtain a first measured value.

1102: Each second cell management apparatus measures, on the resource in which the uplink reference signal is located, the uplink reference signal sent by the UE within the first cell, to obtain a second measured value.

1103: An interference coordination apparatus coordinates downlink transmit power of the first cell and downlink transmit power of the at least one neighboring cell of the first cell according to the first measured value and at least one second measured value.

According to the foregoing solution, each cell management apparatus obtains a measured value based on an uplink reference signal sent by UE, in this way, not only interference from a neighboring cell of a cell to an edge UE in the cell but also interference from the neighboring cell to a non-edge UE in the cell can be considered; and an interference coordination apparatus coordinates transmit power of cells according to the measured values obtained based on the uplink reference signal, which effectively reduces inter-cell interference. Besides, because the interference to the non-edge UE is considered, a throughput gain of UE which is near the center of the cell and is subject to weak interference can be improved, thereby increasing a network capacity.

It should be noted that the cell management apparatuses may send their respective measured values to the interference coordination apparatus separately, or may send their respective measured values to a cell management apparatus (for example, the first cell management apparatus) collectively, and the cell management apparatus then sends the measured values to the interference coordination apparatus. Besides, the measured values sent to the interference coordination apparatus may be values that are not processed, or may be values that are preprocessed, for example, values that undergo filtering processing.

Besides, the cell management apparatuses may send their respective measured values to the first cell management apparatus, and the first cell management apparatus processes the measured values and then sends the measured values to the interference coordination apparatus. For example, the first cell management apparatus sorts the measurements values according to UE, and then sends the measured values to the interference coordination apparatus, so that the interference coordination apparatus can coordinate downlink transmit power according to measured values of each UE. Certainly, the measured values may not be processed by the first cell management apparatus; in this case, the interference coordination apparatus needs to sort the measured values, so as to compute an MCS by using all measured values of a UE as an input, thereby determining a scheduling priority to determine optimal transmit power. In brief, a manner for reporting a measured value by each cell management apparatus is not limited in the embodiment of the present application; the cell management apparatuses may report their respective measured values to the interference coordination apparatus separately, or may report the measured values to the interference coordination apparatus by using a cell management apparatus. Besides, whether the reported measured values are processed is not limited either.

Optionally, as an embodiment, each second cell management apparatus may send the second measured value to the first cell management apparatus, and the first cell management apparatus may receive the second measured value sent by each second cell management apparatus. Further, the first cell management apparatus sends the at least one second measured value to the interference coordination apparatus. The received second measured values may be sorted according to UE and then sent to the interference coordination apparatus. The interference coordination apparatus then computes an MCS by using all measured values of each UE as an input, thereby determining a scheduling priority to determine optimal transmit power.

Optionally, as another embodiment, the configuration information of the uplink reference signal may include a time resource, a frequency resource, or a time-frequency resource used by the UE to send the uplink reference signal. In this way, the neighboring cell may measure, on a corresponding resource, the uplink reference signal sent by the UE.

Optionally, as another embodiment, the first cell management apparatus may further determine interference information according to the first measured value and the at least one second measured value, where the interference information may be an SNR, an SIR, or the like, and send the interference information to the interference coordination apparatus. The interference coordination apparatus receives the interference information sent by the cell management apparatus of the first cell, and groups multiple cells in the communications system into at least one cluster according to the interference information, where the first cell and at least one neighboring cell of the first cell belong to a same cluster.

Optionally, as another embodiment, the uplink RS may be an uplink SRS, or may be another uplink RS. It should be understood that this is not limited in the embodiment of the present application. Besides, the measured value may be RSRP and/or RSRQ of the uplink SRS. The measurement performed based on the uplink reference signal has higher stability and measurement accuracy than measurement performed based on a downlink reference signal. Therefore, the transmit power of the multiple cells is coordinated more accurately, which reduces inter-cell interference more effectively.

It should be understood that the technical solution in the embodiment of the present application may be applied to different scenarios. Optionally, the cell management apparatus of each cell and the interference coordination apparatus may be located in a communications system of multiple BBUs networking, where the multiple BBUs are placed together, the interference coordination apparatus is located in any BBU of the multiple BBUs, and the cell management apparatus of each cell is located in a BBU corresponding to the cell. Optionally, the cell management apparatus of each cell and the interference coordination apparatus may be located in a communications system of distributed base station networking, and a coordinator is deployed in the communications system, each base station in the communications system is connected to the coordinator, the interference coordination apparatus is located in the coordinator or any base station in the communications system, and the cell management apparatus of each cell is located in a base station corresponding to the cell.

Figure 12:
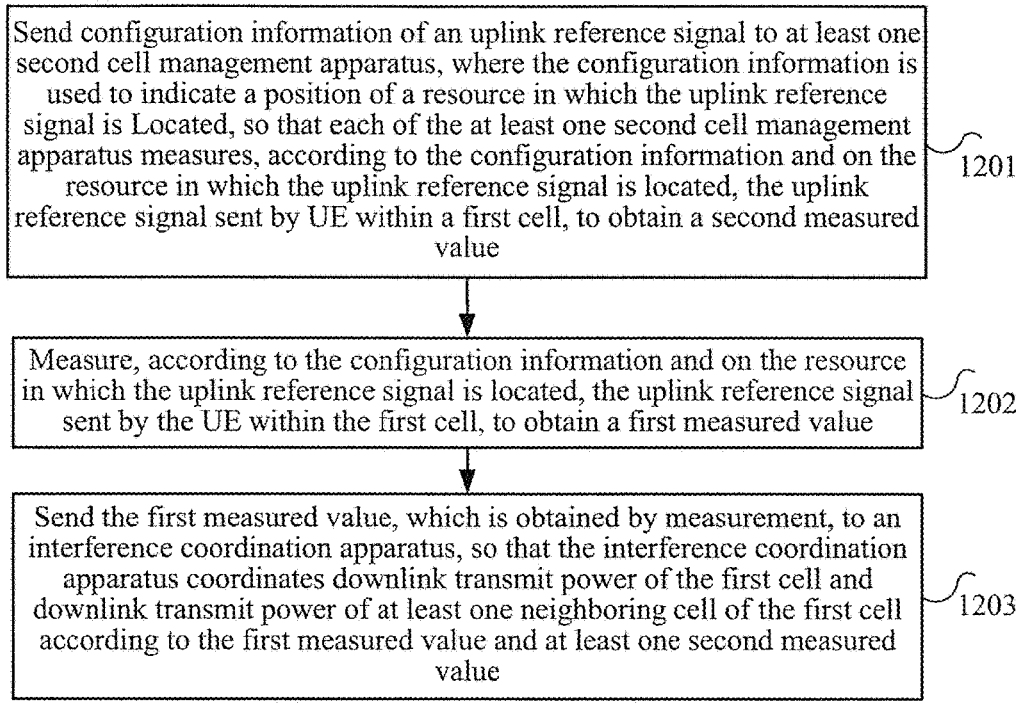
FIG. 12 is a flowchart of an interference coordination method according to another embodiment of the present application.

FIG. 12 is a flowchart of an interference coordination method according to an embodiment of the present application. The method in FIG. 12 may be implemented by the foregoing first cell management apparatus. Therefore, a repeated description is omitted to a certain degree.

The method is applicable to a communications system, where the communications system includes a first cell and at least one neighboring cell of the first cell, where each cell corresponds to one cell management apparatus, a cell management apparatus corresponding to the first cell is a first cell management apparatus, and a cell management apparatus corresponding to the neighboring cell of the first cell is a second cell management apparatus. It should be noted that in the embodiment of the present application, each cell management apparatus may correspond to one or more cells.

1201: Send configuration information of an uplink reference signal to at least one second cell management apparatus, where the configuration information is used to indicate a position of a resource in which the uplink reference signal is located, so that each of the at least one second cell management apparatus measures, according to the configuration information and on the resource in which the uplink reference signal is located, the uplink reference signal sent by UE within the first cell, to obtain a second measured value.

1202: Measure, according to the configuration information and on the resource in which the uplink reference signal is located, the uplink reference signal sent by the UE within the first cell, to obtain a first measured value.

1203: Send the first measured value, which is obtained by measurement, to an interference coordination apparatus, so that the interference coordination apparatus coordinates downlink transmit power of the first cell and downlink transmit power of the at least one neighboring cell of the first cell according to the first measured value and at least one second measured value.

According to the foregoing solution, each cell management apparatus obtains a measured value based on an uplink reference signal sent by UE, in this way, not only interference from a neighboring cell of a cell to an edge UE in the cell but also interference from the neighboring cell to a non-edge UE in the cell can be considered, and an interference coordination apparatus coordinates transmit power of cells according to the measured values obtained based on the uplink reference signal, which can effectively reduce inter-cell interference. Besides, because the interference to the non-edge UE is considered, a throughput gain of UE which is near the center of the cell and is subject to weak interference can be improved, thereby increasing a network capacity.

It should be noted that the cell management apparatuses may send their respective measured values to the interference coordination apparatus separately, or may send their respective measured values to a cell management apparatus (for example, the first cell management apparatus) collectively, and the cell management apparatus then sends the measured values to the interference coordination apparatus. Besides, the measured values sent to the interference coordination apparatus may be values that are not processed, or may be values that are preprocessed, for example, values that undergo filtering processing.

Besides, the cell management apparatuses may send their respective measured values to the first cell management apparatus, and the first cell management apparatus processes the measured values and then sends the measured values to the interference coordination apparatus. For example, the first cell management apparatus sorts the measurements values according to UE, and then sends the measured values to the interference coordination apparatus, so that the interference coordination apparatus can coordinate downlink transmit power according to measured values of each UE. Certainly, the measured values may not be processed by the first cell management apparatus; in this case, the interference coordination apparatus needs to sort the measured values, so as to compute an MCS by using all measured values of a UE as an input, thereby determining a scheduling priority to determine optimal transmit power. In brief, a manner for reporting a measured value by each cell management apparatus is not limited in the embodiment of the present application; the cell management apparatuses may report their respective measured values to the interference coordination apparatus separately, or may report the measured values to the interference coordination apparatus by using a cell management apparatus. Besides, whether the reported measured values are processed is not limited either.

Optionally, as another embodiment, the second measured value sent by each second cell management apparatus may be received. Further, the at least one second measured value is sent to the interference coordination apparatus; or interference information is determined according to the first measured value and the at least one second measured value, where the interference information may be an SNR, an SIR, or the like. The interference information is sent to the interference coordination apparatus, so that the interference coordination apparatus groups multiple cells in the communications system into at least one cluster according to the interference information, where the first cell and at least one neighboring cell of the first cell belong to a same cluster.

Optionally, the uplink RS may be an uplink SRS, or may be another uplink RS. It should be understood that this is not limited in the embodiment of the present application. Besides, the measured value may be RSRP and/or RSRQ of the uplink SRS. The measurement performed based on the uplink reference signal has higher stability and measurement accuracy than measurement performed based on a downlink reference signal. Therefore, the transmit power of the multiple cells is coordinated more accurately, which reduces inter-cell interference more effectively.

Optionally, the configuration information of the uplink reference signal may include a time resource, a frequency resource, or a time-frequency resource used by the UE to send the uplink reference signal. In this way, the neighboring cell may measure, on a corresponding resource, the uplink reference signal sent by the UE.

It should be understood that the technical solution in the embodiment of the present application may be applied to different scenarios. Optionally, the cell management apparatus of each cell and the interference coordination apparatus may be located in a communications system of multiple BBUs networking, where the multiple BBUs are placed together, the interference coordination apparatus is located in any BBU of the multiple BBUs, and the cell management apparatus of each cell is located in a BBU corresponding to the cell. Optionally, the cell management apparatus of each cell and the interference coordination apparatus may be located in a communications system of distributed base station networking, and a coordinator is deployed in the communications system, each base station in the communications system is connected to the coordinator, the interference coordination apparatus is located in the coordinator or any base station in the communications system, and the cell management apparatus of each cell is located in a base station corresponding to the cell.

Figure 13:
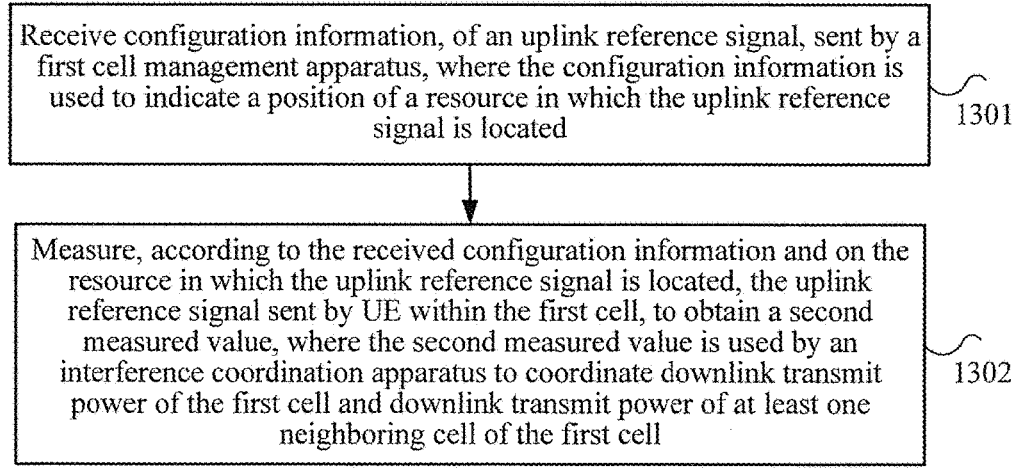
FIG. 13 is a flowchart of an interference coordination method according to another embodiment of the present application.

FIG. 13 is a flowchart of an interference coordination method according to an embodiment of the present application. The method in FIG. 13 may be implemented by the foregoing second cell management apparatus. Therefore, a repeated description is omitted to a certain degree.

The method is applicable to a communications system, where the communications system includes a first cell and at least one neighboring cell of the first cell, where each cell corresponds to one cell management apparatus, a cell management apparatus corresponding to the first cell is a first cell management apparatus, and a cell management apparatus corresponding to the neighboring cell of the first cell is a second cell management apparatus. It should be noted that in the embodiment of the present application, each cell management apparatus may correspond to one or more cells.

1301: Receive configuration information, of an uplink reference signal, sent by the first cell management apparatus, where the configuration information is used to indicate a position of a resource in which the uplink reference signal is located.

1302: Measure, according to the received configuration information and on the resource in which the uplink reference signal is located, the uplink reference signal sent by UE within the first cell, to obtain a second measured value, where the second measured value is used by an interference coordination apparatus to coordinate downlink transmit power of the first cell and downlink transmit power of the at least one neighboring cell of the first cell.

According to the foregoing solution, each cell management apparatus obtains a measured value based on an uplink reference signal sent by UE, in this way, not only interference from a neighboring cell of a cell to an edge UE in the cell but also interference from the neighboring cell to a non-edge UE in the cell can be considered, and an interference coordination apparatus coordinates transmit power of cells according to the measured values obtained based on the uplink reference signal, which can effectively reduce inter-cell interference. Besides, because the interference to the non-edge UE is considered, a throughput gain of UE which is near the center of the cell and is subject to weak interference can be improved, thereby increasing a network capacity.

It should be noted that the cell management apparatuses may send their respective measured values to the interference coordination apparatus separately, or may send their respective measured values to a cell management apparatus (for example, the first cell management apparatus) collectively, and the cell management apparatus then sends the measured values to the interference coordination apparatus. Besides, the measured values sent to the interference coordination apparatus may be values that are not processed, or may be values that are preprocessed, for example, values that undergo filtering processing.

Besides, the cell management apparatuses may send their respective measured values to the first cell management apparatus, and the first cell management apparatus processes the measured values and then sends the measured values to the interference coordination apparatus. For example, the first cell management apparatus sorts the measurements values according to UE, and then sends the measured values to the interference coordination apparatus, so that the interference coordination apparatus can coordinate downlink transmit power according to measured values of each UE. Certainly, the measured values may not be processed by the first cell management apparatus; in this case, the interference coordination apparatus needs to sort the measured values, so as to compute an MCS by using all measured values of a UE as an input, thereby determining a scheduling priority to determine optimal transmit power. In brief, a manner for reporting a measured value by each cell management apparatus is not limited in the embodiment of the present application; the cell management apparatuses may report their respective measured values to the interference coordination apparatus separately, or may report the measured values to the interference coordination apparatus by using a cell management apparatus. Besides, whether the reported measured values are processed is not limited either.

Optionally, as another embodiment, the second measured value may be sent to the interference coordination apparatus; or the second measured value is sent to the first cell management apparatus, and the second measured value is sent by the first cell management apparatus to the interference coordination apparatus; or the second measured value is used by the first cell management apparatus to determine interference information, so that the interference coordination apparatus groups multiple cells in the communications system into at least one cluster according to the interference information, where the first cell and at least one neighboring cell of the first cell belong to a same cluster.

Optionally, the uplink RS may be an uplink SRS, or may be another uplink RS. It should be understood that this is not limited in the embodiment of the present application. Besides, the measured value may be RSRP and/or RSRQ of the uplink SRS. The measurement performed based on the uplink reference signal has higher stability and measurement accuracy than measurement performed based on a downlink reference signal. Therefore, the transmit power of the multiple cells is coordinated more accurately, which reduces inter-cell interference more effectively.

Optionally, the configuration information of the uplink reference signal may include a time resource, a frequency resource, or a time-frequency resource used by the UE to send the uplink reference signal. In this way, the neighboring cell may measure, on a corresponding resource, the uplink reference signal sent by the UE.

It should be understood that the technical solution in the embodiment of the present application may be applied to different scenarios. Optionally, the cell management apparatus of each cell and the interference coordination apparatus may be located in a communications system of multiple BBUs networking, where the multiple BBUs are placed together, the interference coordination apparatus is located in any BBU of the multiple BBUs, and the cell management apparatus of each cell is located in a BBU corresponding to the cell. Optionally, the cell management apparatus of each cell and the interference coordination apparatus may be located in a communications system of distributed base station networking, and a coordinator is deployed in the communications system, each base station in the communications system is connected to the coordinator, the interference coordination apparatus is located in the coordinator or any base station in the communications system, and the cell management apparatus of each cell is located in a base station corresponding to the cell.

Figure 14:
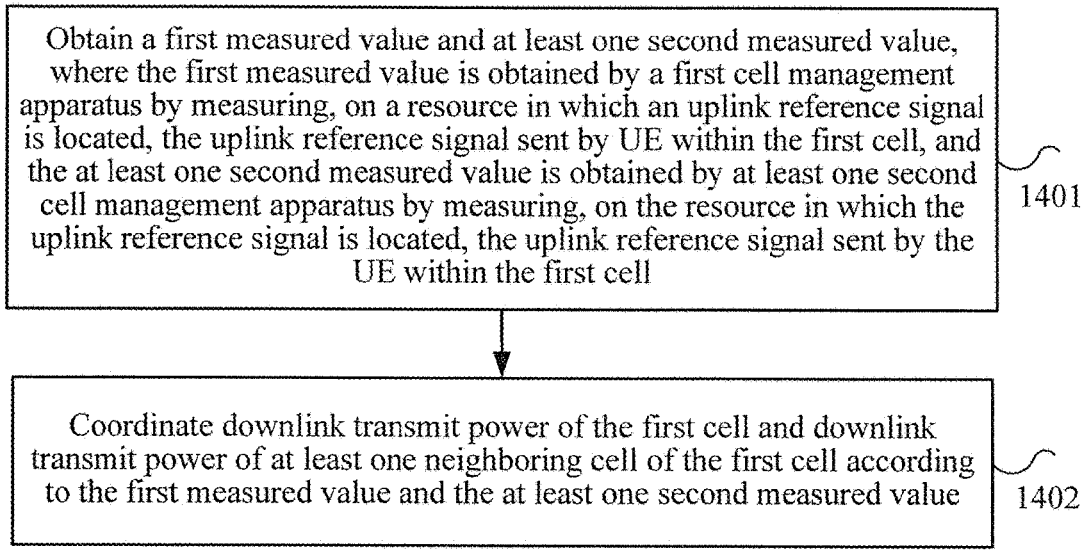
FIG. 14 is a flowchart of an interference coordination method according to another embodiment of the present application.

FIG. 14 is a flowchart of an interference coordination method according to an embodiment of the present application. The method in FIG. 14 may be implemented by the foregoing interference coordination apparatus. Therefore, a repeated description is omitted to a certain degree.

The method is applicable to a communications system, where the communications system includes a first cell and at least one neighboring cell of the first cell, where each cell corresponds to one cell management apparatus, a cell management apparatus corresponding to the first cell is a first cell management apparatus, and a cell management apparatus corresponding to the neighboring cell of the first cell is a second cell management apparatus. It should be noted that in the embodiment of the present application, each cell management apparatus may correspond to one or more cells.

1401: Obtain a first measured value and at least one second measured value, where the first measured value is obtained by the first cell management apparatus by measurement, on a resource in which an uplink reference signal is located, the uplink reference signal sent by UE within the first cell, and the at least one second measured value is obtained by at least one second cell management apparatus by measurement, on the resource in which the uplink reference signal is located, the uplink reference signal sent by the UE within the first cell.

1402: Coordinate downlink transmit power of the first cell and downlink transmit power of the at least one neighboring cell of the first cell according to the first measured value and the at least one second measured value.

According to the foregoing solution, each cell management apparatus obtains a measured value based on an uplink reference signal sent by UE, in this way, not only interference from a neighboring cell of a cell to an edge UE in the cell but also interference from the neighboring cell to a non-edge UE in the cell can be considered; and an interference coordination apparatus coordinates transmit power of cells according to the measured values obtained based on the uplink reference signal, which effectively reduces inter-cell interference. Besides, because the interference to the non-edge UE is considered, a throughput gain of UE which is near the center of the cell and is subject to weak interference can be improved, thereby increasing a network capacity.

It should be noted that the cell management apparatuses may send their respective measured values to the interference coordination apparatus separately, or may send their respective measured values to a cell management apparatus (for example, the first cell management apparatus) collectively, and the cell management apparatus then sends the measured values to the interference coordination apparatus. Besides, the measured values sent to the interference coordination apparatus may be values that are not processed, or may be values that are preprocessed, for example, values that undergo filtering processing.

Besides, the cell management apparatuses may send their respective measured values to the first cell management apparatus, and the first cell management apparatus processes the measured values and then sends the measured values to the interference coordination apparatus. For example, the first cell management apparatus sorts the measurements values according to UE, and then sends the measured values to the interference coordination apparatus, so that the interference coordination apparatus can coordinate downlink transmit power according to measured values of each UE. Certainly, the measured values may not be processed by the first cell management apparatus; in this case, the interference coordination apparatus needs to sort the measured values, so as to compute an MCS by using all measured values of a UE as an input, thereby determining a scheduling priority to determine optimal transmit power. In brief, a manner for reporting a measured value by each cell management apparatus is not limited in the embodiment of the present application; the cell management apparatuses may report their respective measured values to the interference coordination apparatus separately, or may report the measured values to the interference coordination apparatus by using a cell management apparatus. Besides, whether the reported measured values are processed is not limited either.

Optionally, as an embodiment, in step 1401, the first measured value and the at least one second measured value may be obtained from the first cell management apparatus; or the first measured value is obtained from the first cell management apparatus and the at least one second measured value is obtained from the at least one second cell management apparatus.

Optionally, in another embodiment, interference information sent by the first cell management apparatus may be received. The interference information includes but is not limited to an SNR, an SIR, or the like. Multiple cells in the communications system are grouped into at least one cluster according to the received interference information, where the first cell and at least one neighboring cell of the first cell belong to a same cluster.

Optionally, the uplink RS may be an uplink SRS, or may be another uplink RS. It should be understood that this is not limited in the embodiment of the present application. Besides, the measured value may be RSRP and/or RSRQ of the uplink SRS. The measurement performed based on the uplink reference signal has higher stability and measurement accuracy than measurement performed based on a downlink reference signal. Therefore, the transmit power of the multiple cells is coordinated more accurately, which reduces inter-cell interference more effectively.

Optionally, the configuration information of the uplink reference signal may include a time resource, a frequency resource, or a time-frequency resource used by the UE to send the uplink reference signal. In this way, the neighboring cell may measure, on a corresponding resource, the uplink reference signal sent by the UE.

It should be understood that the technical solution in the embodiment of the present application may be applied to different scenarios. Optionally, the cell management apparatus of each cell and the interference coordination apparatus may be located in a communications system of multiple BBUs networking, where the multiple BBUs are placed together, the interference coordination apparatus is located in any BBU of the multiple BBUs, and the cell management apparatus of each cell is located in a BBU corresponding to the cell. Optionally, the cell management apparatus of each cell and the interference coordination apparatus may be located in a communications system of distributed base station networking, and a coordinator is deployed in the communications system, each base station in the communications system is connected to the coordinator, the interference coordination apparatus is located in the coordinator or any base station in the communications system, and the cell management apparatus of each cell is located in a base station corresponding to the cell.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in an actual implementation. For example, a plurality of units or components may be combined or integrated into another system, or some features may be ignored or not performed. Furthermore, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to an actual need to achieve the objectives of the solutions of the embodiments.

In addition, functional units in the embodiments of the present application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present application essentially, or the part contributing to the prior art, or a part of the technical solutions may be implemented in a form of a software product. The software product is stored in a storage medium, and includes several instructions for instructing a computer device (which may be a personal computer, a server, or a network device) to perform all or a part of the steps of the methods described in the embodiments of the present application. The storage medium includes any medium that can store program code, such as a USB flash drive, a removable hard disk, a read-only memory (ROM), a random access memory (RAM), a magnetic disk, or an optical disc.

The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A first cell management apparatus, configured to manage a first cell in a communications system, wherein the communications system comprises the first cell and at least one neighboring cell of the first cell, wherein each cell corresponds to one cell management apparatus, the first cell management apparatus comprising:
   a non-transitory computer readable storage medium configured to store instructions; and
   a processor configured, when executing the instructions, to:
      send configuration information of an uplink reference signal to at least one second cell management apparatus, each of the at least one second cell management apparatus corresponding to one of the at least one neighboring cell, wherein the configuration information indicates a position of a resource in which the uplink reference signal is located, the configuration information enabling each second cell management apparatus to measure, according to the configuration information and on the resource in which the uplink reference signal is located, the uplink reference signal sent by user equipment within the first cell, to obtain at least one second measured value;

receive the at least one second measured value sent by the at least one second cell management apparatus;

measure, according to the configuration information and on the resource in which the uplink reference signal is located, the uplink reference signal sent by the user equipment within the first cell, to obtain a first measured value;

send the first measured value and the at least one second measured value to an interference coordination apparatus, the measured values enabling the interference coordination apparatus to coordinate downlink transmit power of the first cell and downlink transmit power of the at least one neighboring cell of the first cell according to the first measured value and the at least one second measured value;

determine interference ratio information according to the first measured value and the at least one second measured value; and send the interference ratio information to the interference coordination apparatus, the interference ratio information enabling the interference coordination apparatus to group multiple cells in the communications system into at least one cluster according to the interference ratio information, wherein the first cell and at least one neighboring cell of the first cell belong to a same cluster.

2. The apparatus according to claim 1, wherein the uplink reference signal is a sounding reference signal (SRS).

3. The apparatus according to claim 1, wherein the resource in which the uplink reference signal is located comprises a time resource, a frequency resource, or a time-frequency resource in which the uplink reference signal is located.

4. The apparatus according to claim 1, wherein:
the first measured value comprises uplink reference signal received power (RSRP) or uplink reference signal received quality (RSRQ); and
the second measured value comprises uplink reference signal received power (RSRP) or uplink reference signal received quality (RSRQ).

5. A second cell management apparatus, configured to manage a neighboring cell of a first cell in a communications system, wherein the communications system comprises the first cell and at least one neighboring cell of the first cell, wherein each cell corresponds to one cell management apparatus, the second cell management apparatus comprising:

a non-transitory computer readable storage medium configured to store instructions; and a processor configured, when executing the instructions, to:
receive configuration information, of an uplink reference signal, sent by a first cell management apparatus corresponding to the first cell, wherein the configuration information indicates a position of a resource in which the uplink reference signal is located;

measure, according to the configuration information and on the resource in which the uplink reference signal is located, the uplink reference signal sent by user equipment within the first cell, to obtain a second measured value; and send the second measured value to the first cell management apparatus, the second measured value enabling the first cell management apparatus to determine interference ratio information and send (i) a first measured value obtained by the first cell management apparatus, (ii) the second measured value, and (iii) the interference ratio information to an interference coordination apparatus, wherein the first measured value and the second measured value enable the interference coordination apparatus to coordinate downlink transmit power of the first cell and downlink transmit power of the at least one neighboring cell of the first cell, and wherein the interference ratio information enables the interference coordination apparatus to group multiple cells in the communications system into at least one cluster according to the interference ratio information, wherein the first cell and at least one neighboring cell of the first cell belong to a same cluster.

6. The apparatus according to claim 5, wherein the uplink reference signal is a sounding reference signal (SRS).

7. The apparatus according to claim 5, wherein the resource in which the uplink reference signal is located comprises a time resource, a frequency resource, or a time-frequency resource in which the uplink reference signal is located.

8. The apparatus according to claim 5, wherein:
the second measured value comprises uplink reference signal received power (RSRP) or uplink reference signal received quality (RSRQ).

9. An interference coordination apparatus, configured to coordinate downlink transmit power of multiple cells in a communications system, wherein the multiple cells comprise a first cell and at least one neighboring cell of the first cell, wherein each cell corresponds to one cell management apparatus, the interference coordination apparatus comprising:

a non-transitory computer readable storage medium configured to store instructions; and a processor configured, when executing the instructions, to:
receive a first measured value and at least one second measured value from a first cell management apparatus corresponding to the first cell, wherein the first measured value is obtained by the first cell management apparatus by measurement, on a resource in which an uplink reference signal is located, the uplink reference signal sent by user equipment within the first cell, and the at least one second measured value is obtained by at least one second cell management apparatus by measurement, on the resource in which the uplink reference signal is located, the uplink reference signal sent by the user equipment within the first cell, the at least one second measured value sent by the at least one second cell management apparatus to the first cell management apparatus;

coordinate downlink transmit power of the first cell and downlink transmit power of the at least one neighboring cell of the first cell according to the first measured value and the at least one second measured value;

receive interference ratio information sent by the first cell management apparatus; and group the multiple cells in the communications system into at least one cluster according to the interference ratio information, wherein the first cell and at least one neighboring cell of the first cell belong to a same cluster.

10. The apparatus according to claim 9, wherein the uplink reference signal is a sounding reference signal (SRS).

11. The apparatus according to claim 9, wherein the resource in which the uplink reference signal is located comprises a time resource, a frequency resource, or a time-frequency resource in which the uplink reference signal is located.

12. The apparatus according to claim 9, wherein:
the first measured value comprises uplink reference signal received power (RSRP) or uplink reference signal received quality (RSRQ); and
the second measured value comprises uplink reference signal received power (RSRP) or uplink reference signal received quality (RSRQ).

* * * * *